United States Patent
Gregory et al.

(10) Patent No.: US 9,891,782 B2
(45) Date of Patent: Feb. 13, 2018

(54) METHOD AND ELECTRONIC DEVICE FOR PROVIDING USER INTERFACE

(71) Applicant: Samsung Electronics Co., Ltd., Gyeonggi-do (KR)

(72) Inventors: Ek Gregory, Seoul (KR); Paul Braun, Seoul (KR); Jody Medich, San Francisco, CA (US)

(73) Assignee: Samsung Electronics Co., Ltd (KR)

( * ) Notice: Subject to any disclaimer, the term of this patent is extended or adjusted under 35 U.S.C. 154(b) by 203 days.

(21) Appl. No.: 14/658,789

(22) Filed: Mar. 16, 2015

(65) Prior Publication Data
US 2015/0324087 A1 Nov. 12, 2015

(30) Foreign Application Priority Data
Mar. 14, 2014 (KR) .................. 10-2014-0030625

(51) Int. Cl.
| | |
|---|---|
| *G06F 3/01* | (2006.01) |
| *G06F 3/0481* | (2013.01) |
| *G06F 3/044* | (2006.01) |
| *G06F 3/0482* | (2013.01) |
| *G06F 3/0484* | (2013.01) |
| *G06F 3/0488* | (2013.01) |

(52) U.S. Cl.
CPC .......... *G06F 3/04812* (2013.01); *G06F 3/013* (2013.01); *G06F 3/017* (2013.01); *G06F 3/044* (2013.01); *G06F 3/0482* (2013.01); *G06F 3/0488* (2013.01); *G06F 3/04845* (2013.01); *G06F 3/04883* (2013.01); *G06F 3/04886* (2013.01); *G06F 2203/04106* (2013.01); *G06F 2203/04803* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 2007/0238489 A1 | 10/2007 | Scott | |
| 2011/0169749 A1* | 7/2011 | Ganey | G06F 1/1626 345/173 |
| 2011/0298743 A1 | 12/2011 | Machida et al. | |

(Continued)

FOREIGN PATENT DOCUMENTS

| | | | | |
|---|---|---|---|---|
| EP | 2 664 985 | 11/2013 | | |
| WO | WO 2015071947 A1 * | 5/2015 | ........... | G06F 3/0418 |

OTHER PUBLICATIONS

European Search Report dated Jul. 31, 2015 issued in counterpart application No. 15159044.5-1972, 6 pages.

*Primary Examiner* — Seokyun Moon
(74) *Attorney, Agent, or Firm* — The Farrell Law Firm, P.C.

(57) ABSTRACT

An electronic device that uses a method of providing user interface is provided. The method includes detecting a first touch input within a predetermined distance from an edge of a touch screen, displaying a first cursor at a position spaced away from the first touch input in response to the first touch input, detecting a movement of the first touch input in a first area, the first area being mapped to a screen of the touch screen and determined according to a position where the first touch input occurs, and moving the first cursor in the same manner as the movement of the first touch input in the first area.

17 Claims, 20 Drawing Sheets

(56) References Cited

U.S. PATENT DOCUMENTS

| | | |
|---|---|---|
| 2012/0036471 A1 | 2/2012 | Swanson et al. |
| 2012/0169610 A1 | 7/2012 | Berkes et al. |
| 2013/0057475 A1 | 3/2013 | Duggan et al. |
| 2013/0069987 A1* | 3/2013 | Choe .................... G06F 3/0488 345/649 |
| 2013/0073999 A1 | 3/2013 | Swanson et al. |
| 2013/0127738 A1* | 5/2013 | Miller .................... G06F 3/0488 345/173 |
| 2013/0132899 A1 | 5/2013 | Scott |
| 2013/0145304 A1* | 6/2013 | DeLuca .................. G06F 3/013 715/781 |
| 2013/0169560 A1* | 7/2013 | Cederlund ............. G06F 3/013 345/173 |
| 2013/0174092 A1 | 7/2013 | Li et al. |
| 2013/0201151 A1* | 8/2013 | Takashima ............. G06F 3/044 345/174 |
| 2013/0307797 A1 | 11/2013 | Taguchi et al. |
| 2014/0015778 A1* | 1/2014 | Taguchi ................. G06F 3/041 345/173 |
| 2016/0253042 A1* | 9/2016 | Niwa .................... G06F 3/0418 |

* cited by examiner

METHOD AND ELECTRONIC DEVICE FOR PROVIDING USER INTERFACE

PRIORITY

This application claims priority under 35 U.S.C. § 119(a) to Korean Patent Application Serial No. 10-2014-0030625, which was filed in the Korean Intellectual Property Office on Mar. 14, 2014, the entire disclosure of which is incorporated herein by reference.

BACKGROUND OF THE INVENTION

1. Field of the Invention

The present invention relates generally to a method and electronic device for providing user interface, and more particularly, to an electronic device that uses a method that allows a user to perform and control functions of an electronic device based a single touch input, multi-touch input, gesture, and/or gaze of a user.

2. Description of the Related Art

As portable mobile devices including smartphones become part of life, as well as high hardware specifications and a variety of functions, user interfaces (UIs) or user experiences (UXs) become more important.

Recently, the UIs and UXs are regarded as an interaction between a user and an electronic device, so that preference for UIs and UXs providing a user-friendly usage environment becomes growing.

SUMMARY OF THE INVENTION

The present invention has been made to address at least the above mentioned problems and/or disadvantages and to provide at least the advantages described below.

Accordingly, an aspect of the present invention provides a method and electronic device for providing UI. Another aspect of the present invention provides a computer-readable recording medium storing a program to execute the method on a computer.

According to an aspect of the present invention, a method of providing user interface is provided. The method includes detecting a first touch input within a predetermined distance from an edge of a touch screen, displaying a first cursor at a position spaced away from the first touch input in response to the first touch input, detecting a movement of the first touch input in a first area, the first area being mapped into a screen of the touch screen and determined according to a position where the first touch input occurs, and moving the first cursor in the same manner as the movement of the first touch input in the first area.

According to another aspect of the present invention, a method of providing user interface is provided. The method includes detecting an input on a screen of an electronic device, determining a user's gazing direction in response to the detected input while the input is being detected, determining a function corresponding to the determined user's gazing direction, and performing the determined function.

According to another aspect of the present invention, an electronic device is provided. The electronic device includes a touch screen configured to display a screen in response to receiving a control signal from a processor and detect a first touch input and the processor configured to control the touch screen, thereby allowing the touch screen, in response to the detected first touch input, which is detected within a predetermined distance from an edge of the touch screen, to display a first cursor at a position spaced away from the first touch input on the touch screen and, according to a movement of the first touch input detected in a first area determined according to a position where the first touch input occurs, to move the first cursor in the same manner as the movement of the first touch input.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Figure 1:
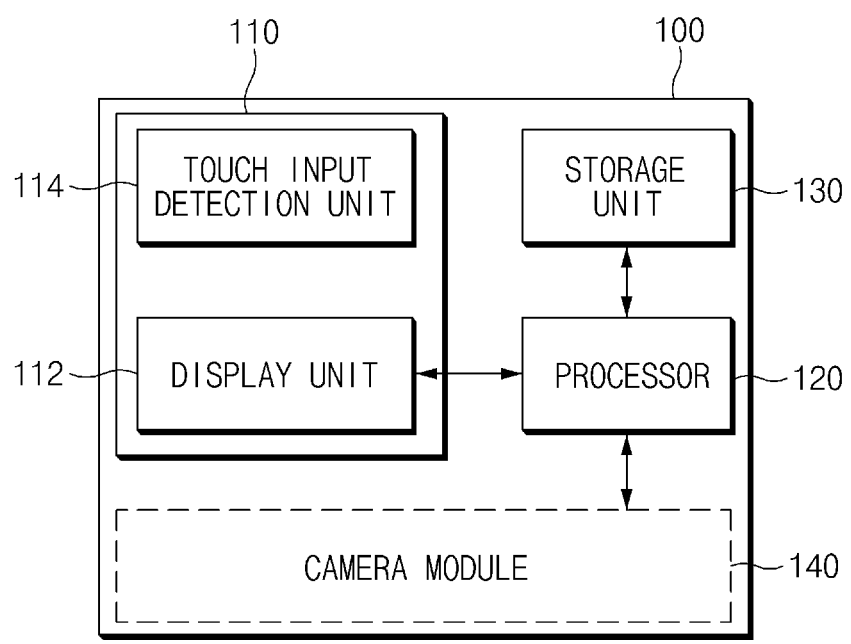
FIG. 1 is a block diagram illustrating an electronic device, according to an embodiment of the present invention.

Hereinafter, embodiments of the present invention are described in detail with reference to the accompanying drawings. Those of ordinary skill in the art will recognize that various changes and modifications of the embodiments described herein can be made without departing from the scope of the present invention. In addition, descriptions of well-known functions and constructions may be omitted for clarity and conciseness. The same reference symbols are used throughout the drawings to refer to the same or like parts.

The terms "include," "comprise," and "have", or "may include," or "may comprise" and "may have" used herein indicate disclosed functions, operations, or existence of elements but do not exclude other functions, operations or elements. The meanings of "include," "comprise," "including," or "comprising," specify a property, a region, a fixed number, a step, a process, an element and/or a component but do not exclude other properties, regions, fixed numbers, steps, processes, elements and/or components.

The meaning of the term "or" used herein includes any or all combinations of the words connected by the term "or". For instance, the expression "A or B" may indicate include A, B, or both A and B.

The terms such as "1st", "2nd", "first", "second", and the like used herein may refer to modifying various different elements of various embodiments, but do not limit the elements. For instance, such terms do not limit the order and/or priority of the elements. Furthermore, such terms may be used to distinguish one element from another element. For instance, both "a first user device" and "a second user device" indicate a user device but indicate different user devices from each other. For example, a first component may be referred to as a second component and vice versa, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The term "module" used in this disclosure, for example, may mean a unit including a combination of at least one of hardware, software, and firmware. The term "module" and the term "unit", "logic", "logical block", "component", or "circuit" may be interchangeably used. "Module" may be a minimum unit or part of an integrally configured component. "Module" may be a minimum unit performing at least one function or part thereof. "Module" may be implemented mechanically or electronically. For example, "module" according, to various embodiments of the present invention may include at least one of an application-specific integrated circuit (ASIC) chip performing certain operations, field-programmable gate arrays (FPGAs), or a programmable-logic device, all of which are known or to be developed in the future.

Terms used in this specification are used to describe specific embodiments, and are not intended to limit the scope of the present invention. The terms in a singular form may include plural forms unless otherwise specified.

Unless otherwise defined herein, all the terms used herein, which include technical or scientific terms, may have the same meaning that is generally understood by a person skilled in the art. It will be further understood that terms, which are defined in the dictionary and in commonly used, should also be interpreted as is customary in the relevant related art and not in an idealized or overly formal sense unless expressly so defined herein.

An electronic device as described herein may have a communication function. For instance, electronic devices may be embodied in the form of at least one of smartphones, tablet personal computers (PCs), mobile phones, video phones, electronic book (e-book) readers, desktop personal computers (PCs), laptop personal computers (PCs), netbook computers, personal digital assistants (PDAs), portable multimedia player (PMPs), MP3 players, mobile medical devices, cameras, and wearable devices (e.g., head-mourned-devices (HMDs) such as electronic glasses, electronic apparel, electronic bracelets, electronic necklaces, electronic accessories, electronic tattoos, and smart watches).

The electronic device may be embodied in smart home appliances having a communication function. The smart home appliances may include at least one of, for example, televisions, digital video disk (DVD) players, audios, refrigerators, air conditioners, cleaners, ovens, microwave ovens, washing machines, air cleaners, set-top boxes, TV boxes (e.g., Samsung HomeSync™, Apple TV™ or Google TV™), game consoles, electronic dictionaries, electronic keys, camcorders, and electronic picture frames.

The electronic device may be embodied at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, car head units, industrial or household robots, financial institutions' automatic teller's machines (ATMs), and point of sales (POS) devices in a store.

The electronic device may be embodied in at least one of furniture or buildings/structures having a communication function, electronic boards, electronic signature receiving devices, projectors, or various measuring instruments (for example, water, electricity, gas, or radio signal measuring instruments). The electronic device may be one of the above-mentioned various devices or a combination thereof. Additionally, the electronic device may be a flexible device. Furthermore, it will be apparent to those skilled in the art that an electronic device is not limited to the above-mentioned devices.

Hereinafter, the electronic device will be described in more detail with reference to the accompanying drawings. The term "user" in various embodiments may refer to a person using an electronic device or a device using an electronic device (for example, an artificial intelligent electronic device).

FIG. 1 is a block diagram illustrating an electronic device 100, according to an embodiment of the present invention.

Referring to FIG. 1, the electronic device 100 includes a touch screen 110, a processor 120, and a storage unit 130. It will be apparent to those skilled in the art that electronic device 100 may include other general components other than the components shown in FIG. 1.

The electronic device 100 uses a user's single touch input, multi-touch input, gesture, and/or gaze, thereby providing a user interface allowing a user to perform and control functions of the electronic device 100 conveniently.

The touch screen 110 is a device for receiving a user input through a displayed screen. The touch screen 110 includes a display unit 112 and a touch input detecting unit 114.

The display unit 112 displays information on the touch screen 110. The display unit 112 displays a screen in response to a control signal of the processor 120.

The touch input detection unit 114 converts a state change of sensors, for example, a change in pressure applied to a surface, a change in capacitance, and/or a change in light intensity, into electrical signals by using sensors provided in the touch screen 110, thereby detecting a touch input.

The touch screen 110 may be implemented through various methods, for example, resistive, capacitive, ultrasonic, and infrared methods. Hereinafter, for convenience of description, it is assumed that the touch input detection unit 114 is a contact type touch screen detecting a touch input by contacting the surface of the touch screen 110 with a body or an object.

The touch input detection unit 114 detects a user's single touch input, multi-touch input, touch input movement, or touch input pattern. Furthermore, the touch input detection unit 114 detects a position of a touch input, a duration time of a touch input, a movement of a touch input, and a touch input's start position, end position, movement direction, movement distance, and movement speed, on the basis of sensor's state changes. For example, the touch input detection unit 114 detects a touch input, for example, drag, flick, tap, touch & hold, double tap, panning, and sweep.

The touch input detection unit 114 transmits a detected touch input to the processor 120. Thus, the electronic device 100 processes a specific function corresponding to the touch input.

The touch input detection unit 114 detects a predetermined touch input. In correspondence to a predetermined touch input, the display unit 112 displays a cursor (for example, a cursor 20 of FIG. 2) at a position spaced from the touch input, or in correspondence to a predetermined touch input, the display unit 112 displays a menu at a position where the touch input occurs.

The touch input detection unit 114 detects a predetermined first touch input and second touch input, and the display unit 112 displays a first cursor and a second cursor corresponding, to the respective touch inputs on the touch screen 110. A user may control functions at the electronic device 100 by moving cursors on the touch screen 110.

The touch input detection unit 114 detects a predetermined first touch input and second touch input, and the display unit 112 displays a first menu and a second menu relating to a content displayed on the touch screen 110. A user may select each item included in the first menu and the second menu by moving the first touch input on the first menu and moving the second touch input on the second menu. A user may deliver the first item from the first menu to the second menu by releasing the first item of the first menu toward the second menu in a predetermined form. According to a movement of a touch input on the first menu and the second menu, a user may control functions of the electronic device 100.

The touch input detection unit 114 detects a predetermined second touch input for activating other functions, for example, an area selection function, a menu activation, and a shortcut, while a predetermined first touch input for generating a first cursor is maintained. The electronic device 100 displays a menu relating to a content displayed on the touch screen 110 in response to the second touch input, or provides a function corresponding to the second touch input, or reflects a function corresponding to the second touch input on the cursor 20 displayed on the touch screen 110, or the electronic device 100 removes the cursor 20 generated by the first touch input in response to the second touch input and displays the first menu relating to a content displayed on the touch screen 110 on the position of the first touch input, or the touch input detection unit 114 detects the second touch input corresponding to a drawn text. The electronic device 100 performs, executes, or creates a shortcut that the text indicates in relation to a content or a menu displayed on the touch screen 110.

Moreover, the electronic device 100 provides various functions by a multi-touch together with the cursor 20. Various embodiments relating to the multi-touch are illustrated in FIGS. 2A to 16C.

A predetermined touch input may be a thumb input. The touch input detection unit 114 distinguishes between a user's thumb input and other touch inputs.

For example, when a size of a touch input provided from a specified area of the touch screen 110 is greater than a predetermined threshold, the touch input detection unit 114 detects the input as a thumb input. The specified area may be an area within a predetermined distance from the edge of the couch screen 110. However, the present invention is not limited thereto and the specified area may be a predetermined partial area on the touch screen 110 or a partial area on the touch screen 110 set by a user.

Or, the touch input detection unit 114 determines whether there is a thumb input through learning using a training mode. On the basis of a touch input in the training mode, the touch input detection unit 114 determines a size, form, or pattern of a touch input corresponding to a thumb input. The touch input detection unit 114 stores a corresponding user's thumb input by each user. The touch input detection unit 114 stores a corresponding user's left thumb input and right thumb input by each user.

The touch input detection unit 114 determines whether there is a thumb input by using a grip sensor equipped at the touch screen 110. The touch screen 110 may include a grip sensor on a side of the electronic device 100 or an edge of the touch screen 110. The touch input detection unit 114 detects the touch input on a specified area of the touch screen 110 as a thumb input while a grip input is maintained through the grip sensor. The specified area may be a touch input received within a predetermined distance from the edge of the touch screen 110. However, the present invention is not limited thereto and the specified area may be a predetermined partial area on the touch screen 110 or a partial area on the touch screen 110 set by a user.

Even when a size of the touch screen 110 of the electronic device 100 is large, a user may control functions of the electronic device 100 with a thumb input. For example, a user may control functions of the electronic device 100 by moving a thumb in a small area near the edge of the touch screen 110.

The processor 120 controls overall operation of the electronic device 100 in addition to operations of the touch screen 110. For example, the processor 120 displays a content on the touch screen 110 or outputs a control signal for moving content in response to a touch input.

In response to a predetermined first touch input detected from a specified area, the processor 120 displays a first cursor at a position spaced from the first touch input on the touch screen. According to a movement of the first touch input detected from a first predetermined area, depending on the position where the first touch input occurs, the processor controls the touch screen 110, thereby moving a first cursor in the same form or manner (or a corresponding form), e.g., in the same direction, as the movement of the first touch input. The specified area may be an area within a predetermined distance from the edge of the touch screen 110. However, the present invention is not limited thereto and the specified area may be a predetermined partial area on the touch screen 110 or a partial area on the touch screen 110 set by a user. Hereinafter, for convenience of description, it is described that the specified area is an area within a predetermined distance from the edge of the touch screen 110.

When the first touch input is released, the processor 120 selects an item displayed at the position of the first cursor of the touch screen 110 at the time when the first touch input is released. For example, the predetermined first touch input may be swipe and hold.

In response to a predetermined second touch input detected within a predetermined distance from the edge of the touch screen 110, the processor 120 displays a second cursor at a position spaced from the second touch input on the touch screen and controls the touch screen 110, thereby moving the second cursor in the same form as a movement of the second touch input, according to a movement of the second touch input detected from a second predetermined area, depending on the position where the second touch input occurs.

When the first cursor and the second cursor are disposed on the same object of the touch screen 110, according to the first touch input and the second touch input moving the first cursor and the second cursor simultaneously, the processor 120 rotates the object.

In response to a predetermined second touch input for activating an area selection function, the processor 120 displays a selection area on the touch screen 110, according to a movement of the first cursor by a movement of the first touch input.

In response to a predetermined touch input detected within a predetermined distance from the edge of the touch screen 110, the processor 120 controls the touch screen 110 thereby displaying a menu relating to the selection area on the touch screen 110.

When a user's gazing position, detected through the camera module 140, is spaced from the position of the first touch input, the processor 120 controls the touch screen 110 thereby displaying the first cursor at the position where the user's gaze is directed. If a user's gazing position, detected through the camera module 140, is identical to the position of the first touch input, the processor 120 controls the touch screen 110 thereby removing the first cursor and displaying a first menu relating to a content displayed on the touch screen, at the position of the first touch input.

When the first touch input moving on the first menu is released, the processor 120 applies an item displayed at the position where the first touch input is released to the content.

When the first menu is a multi-level menu, the processor 120 performs a control to display a sub menu of the item at the position of the first menu through an item selection on the first menu.

When a first item of the first menu is selected by a movement of the first touch input, the processor 120 performs a control to display the first menu in a different form at the position of the first menu.

The processor 120 removes the first cursor in response to a predetermined second touch input detected from the touch screen, displays a first menu relating to a content displayed on the touch screen at the position of the first touch input, and if there is a second menu relating to the content, displays the second menu at the position where the second touch input occurs. When the first item of the first menu is released toward the second menu in a predetermined form, the processor 120 delivers the first hem from the first menu to the second menu. The predetermined form of release may be flick. However, the present invention is not limited thereto and the predetermined form of release may be tap, touch & hold, double tap, panning, or sweep.

When a second touch input corresponding to text drawing on the touch screen is detected, the processor 120 executes a shortcut that the text indicates in relation to the first menu.

When there is an item applicable to the first menu at a user's gazing position detected through the camera module 140, the processor 120 applies an item displayed at the position where the first touch input is released to the item at the user's gazing position.

When an input on the touch screen 110 is detected, the processor 120 determines the direction of the user's gaze in response to the detected input, determines a function corresponding to the determined direction, and performs the determined function.

The processor 120 determines whether the input is provided to a specified area of the touch screen 110, and when the input is provided to the specified area, determines the size of the input. The processor 120 compares the size of the input with as determined threshold, and if the size of the input is greater than the threshold in the specified area, detects the input as a thumb input.

The direction of the user's gaze is determined in response to the detected thumb input. For example, when the direction of the user's gaze is toward the detected thumb input, the processor 120 controls the touch screen 110 thereby displaying a menu relating to a content displayed on the touch screen 110 at the position of the thumb input. On the contrary, when the direction of the user's gaze is not toward the detected thumb input, the processor 120 controls the touch screen 110 thereby displaying a cursor at the user's gazing, position.

When it is determined that the direction of the user's gaze is toward the detected thumb input, the processor 120 determines a function based on whether the direction of the user's gaze is toward the detected thumb input.

When the direction of the user's gaze is toward the detected thumb input, the processor 120 displays a menu in an area of the detected input on the touch screen 110. The menu provides options for controlling an application executed on the electronic device 100. When the direction of the user's gaze is spaced from an area of the detected input, the processor 120 displays a cursor in the direction of the user's gaze on the touch screen 110 and activates a trackpad in the area of the detected input.

When the direction of the user's gaze is toward an area of a second input detected on the touch screen 110, the processor 120 controls the touch screen 110 thereby displaying a second menu in the area of the second input on the touch screen 110. The second menu may provide additional options for controlling the application executed on the electronic device 100.

The processor 120 determines whether an option of the menu is selected and determines whether there is a sub menu for the selected option. If there is no sub menu for the selected option, the processor 120 performs an operation according to the selected option. Or, if there is a sub menu for the selected menu, the processor 120 controls the touch screen 110 thereby displaying a sub menu for the selected option.

The processor 120 adjusts a size of a content displayed on the screen in proportion to a distance from the electronic device 100 to a user.

The processor 120 may be configured with one or more processors.

The storage unit 130, as a typical storage medium, stores information displayed on the touch screen 110. Additionally, the storage unit 130 stores data or programs necessary for detecting a touch input in the touch screen 110. Additionally, the storage unit 130 stores data or programs necessary for controlling the touch screen 110 according to a touch input. Moreover, the storage unit 130 stores data or programs necessary for an operation of the electronic device 100. The storage unit 130 may be implemented with Hard Disk Drive (HDD), Read Only Memory (ROM), Random Access Memory (RAM), Flash Memory, Memory Card, NAND memory, and Solid State Drive (SDD).

The electronic device 100 may further include a camera module 140. The camera module 140 may detect the user's gazing position.

When a predetermined touch input is detected on the touch screen 110, the processor 120 allows the camera module 140 to detect the user's gazing position in response to the touch input. The processor 120 controls the touch screen 110 according to the detected gazing position. For example, while a touch input is detected on the touch screen 110, the camera module 140 determines the direction of the user's gaze in response to the detected touch input. The processor 120 determines a function on the basis of the detected gazing direction and performs the determined function.

The processor 120 changes a control mode on the touch screen 110 by using the user's gaze. The processor 120 changes a control mode into a control by menu instead of a control by cursor. For example, the processor 120 determines whether the gazing direction detected from the camera module 140 is toward an area of the detected touch input. When the direction of the user's gaze is toward the area of the touch input, the touch screen 110 displays a menu in the area of the touch input. The menu may provide options for controlling an application executed on the electronic device 100, or, when the direction of the user's gaze is spaced from the area of the touch input, the touch screen 110 displays a cursor in the direction of the user's gaze and may activate a trackpad in the area of the touch input.

The touch screen 110 detects a second touch input on the touch screen 110. When the direction of the user's gaze is toward an area of the second touch input, the touch screen 110 displays a second menu in the area of the second touch input on the touch screen 110. For example, the second menu may provide additional options for controlling the application executed on the electronic device 100.

The electronic device 100 may include one or more sensors. The electronic device 100 detects a user's gaze, gesture, or grip or determines a distance from the electronic device 100 to a user by using at least one sensor. The one or more sensors may include at least one of a gesture sensor, a proximity sensor, a gyro sensor, an acceleration sensor, a magnetic sensor, a grip sensor, an Infra Red (IR) sensor, an iris sensor, a fingerprint sensor, an illumination sensor, an Ultra Violet (UV) sensor, a color sensor (for example, Red, Green, Blue (RGB) sensor), or a bio sensor.

Figure 2A:
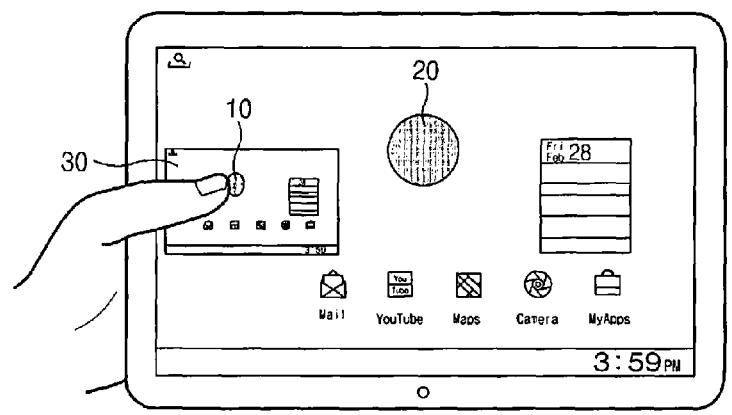
FIGS. 2A-2C are diagrams illustrating a screen for controlling a touch screen by using a cursor in an electronic device, according to an embodiment of the present invention.
Figure 2B:
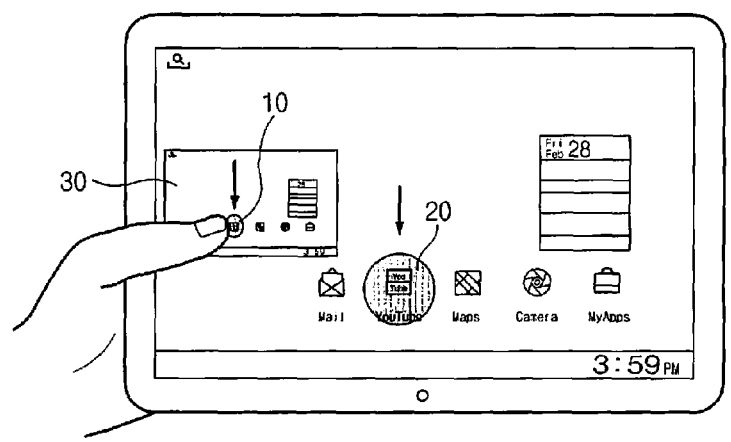
Figure 2C:
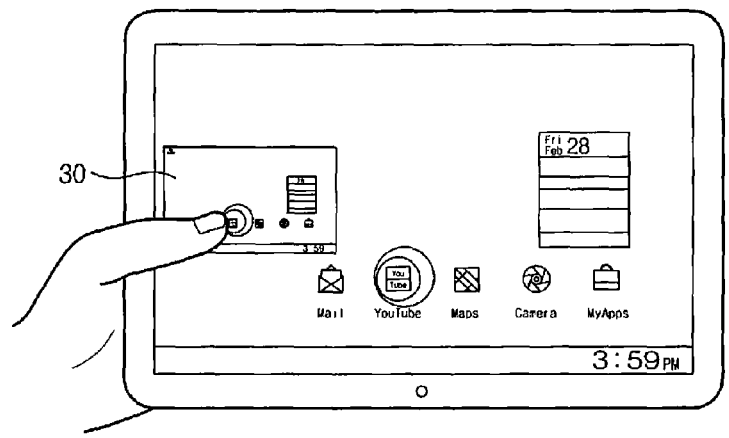

FIGS. 2A-2C are diagrams illustrating a screen for controlling the touch screen 110 by using the cursor 20 in the electronic device 100, according to an embodiment of the present invention.

Referring to FIG. 2A, the cursor 20 may be generated on the touch screen 110 by a user's predetermined touch input 10. In this embodiment, the cursor 20 may be in a form of a circle, but may have various sizes and forms. When a user performs the predetermined touch input 10 by a finger within a predetermined distance from the edge of the touch screen 110, the touch screen 110 may display the cursor 20 at the position spaced from the touch input 10 in response to the predetermined touch input 10. For example, the predetermined touch input 10 may be swipe and hold. The predetermined touch input 10 is not limited thereto and may include different forms of touch input, for example, tap, drag, long touch, or double tap.

A user touches an edge portion of the touch screen 110 by the left thumb while gripping the electronic device 100, thereby generating the cursor 20 at the position spaced from the left thumb. As the size of the touch screen 110 of the electronic device 100 is larger, it becomes more difficult for a user to control the touch screen 110 by using a finger while gripping the electronic device 100. A user may generate the cursor 20 on the touch screen 110 and may then control the entire touch screen 110 only with a movement on a small area near the edge of the touch screen 110 while gripping the electronic device 100. Accordingly, the electronic device 100 may provide user-friendly interface (UI) and user experience (UX) to a user.

When a user performs the predetermined touch input 10 within a predetermined distance from the edge of the touch screen 110, a predetermined area 30 may be determined on the touch screen 110 according to the position where the touch input 10 occurs. The predetermined area 30 represents a partial area of the touch screen 110 mapped into the entire screen of the touch screen 110. The predetermined area 30 may correspond to a virtual area that is not displayed on the touch screen 110. In order to describe the predetermined area 30 mapped into the entire screen of the touch screen 110, a screen obtained by reducing the entire screen of the touch screen 110 is shown in the predetermined area 30, but the present invention is not limited thereto.

When a user moves the touch input 10 on the predetermined area 30, the cursor moves according to the movement of the touch input 10. Referring to FIG. 2B, when the touch input 10 moves in an arrow direction on the predetermined area 30, the cursor 20 on the touch screen 110 moves in the arrow direction at the position on the touch screen 110 corresponding to the arrow of the predetermined area 30.

In such a way, the touch screen 110 moves the cursor 20 in the same form as the movement of the touch input 10 in the predetermined area 30. For example, when a user moves the touch input 10 from one edge of the predetermined area 30 to the opposite edge, the cursor 20 moves from one edge of the touch screen 110 to the opposite edge in response to the movement of the touch input 10. Even when a user moves the finger a short distance in the predetermined area 30, the cursor 20 may move a relatively longer distance in the touch screen 20. Accordingly, a user may navigate the entire touch screen 110 with a small movement in the predetermined area 30. Accordingly, user's convenience may be improved.

As shown in FIG. 2B, when a user moves the touch input 10 in an arrow direction in the predetermined area 30, the cursor 20 moves on the touch screen 110 in the same form as the movement of the touch input 10. For example, when the touch input 10 moves on the YouTube icon in the predetermined area 30, the cursor 20 moves to the position on the touch screen 110 corresponding to the position of the touch input 10. The cursor 20 moves to the position of the YouTube icon on the touch screen 110 in the same form as the movement of the touch input 10.

Referring to FIG. 2C, when a user releases the touch input 10 in the predetermined area 30, the cursor 20 on the touch screen 110 is released.

The touch screen 110 recognizes the release of the touch input 10 as a selection of an area or an item where the cursor 20 is disposed. Accordingly, when the cursor 20 is released, an area of the position of the cursor 20 or an item displayed at the position of the cursor 20 may be selected at the time that the touch input 10 is released. Referring to FIG. 2C, when the cursor 20 is disposed on the YouTube icon, as a user releases the touch input 10 in the predetermined area 30, the YouTube icon may be selected.

In order for a user to select an area or an item on the touch screen 110, additional touch inputs such as click or tap may be further required.

Figure 3:
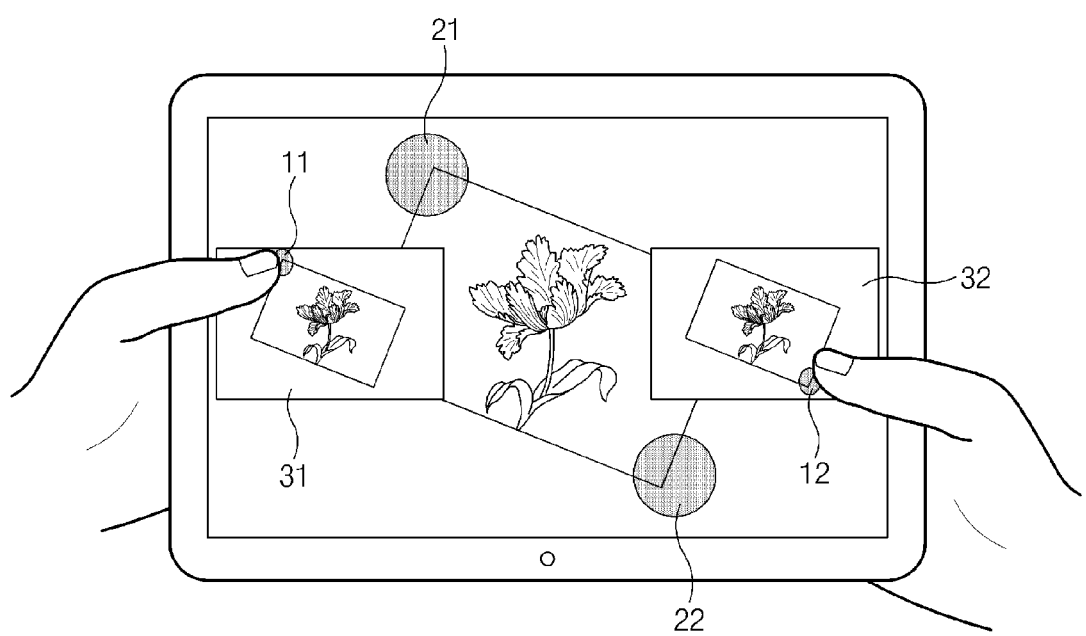
FIG. 3 is a diagram illustrating a screen for controlling a touch screen by multi-touch in an electronic device, according to an embodiment of the present invention.

FIG. 3 is a diagram illustrating a screen for controlling the touch screen 110 by multi-touch in the electronic device 100, according to an embodiment of the present invention.

As described with reference to FIGS. 2A-2C, a first cursor 21 may be generated on the touch screen 110 by a user's predetermined first touch input 11. A user may generate a second cursor 22 on the touch screen 110 by touching the opposite finger in the same manner.

A user may generate the first cursor 21 by touching an edge portion of the touch screen 110 by the left thumb while gripping the electronic device 100. A user may generate a second cursor 22 by touching the touch screen 110 by the right thumb.

As described with reference to FIGS. 2A-2C, a first predetermined area 31 may be determined on the touch screen 110 according to the position where the first touch input 11 occurs. A second predetermined area 32 may be determined on the touch screen 110 according to the position where the second touch input 12 occurs.

Each of the first predetermined area 31 and the second predetermined area 32 represents a partial area of the touch screen 110 mapped into the entire screen of the touch screen 110. The first predetermined area 31 and the second predetermined area 32 corresponds to a virtual area that is not displayed on the touch screen 110.

Referring to FIG. 3, the first predetermined area 31 and the second predetermined area 32 are shown at the position of the first touch input 11 and the position of the second touch input, respectively. However, the first predetermined area 31 and the second predetermined area 32 shown in FIG. 3 are provided to illustrate that each area is mapped into an entire screen of the touch screen 110, but the present invention is not limited thereto.

The first cursor 21 and the second cursor 22 are displayed at the respective positions on the touch screen 110 corresponding to the position of the first touch input 11 in the first predetermined area 31 and the position of the second touch input 12 in the second predetermined area 32. When a user moves a touch input in each of the first predetermined area 31 and the second predetermined area 32, the first cursor 21 and the second cursor 22 move on the touch screen 110 in the same form as the movement of each touch input.

As shown in FIG. 3, when the first cursor 21 and the second cursor 22 are disposed on the same object of the touch screen 110 and the touch screen 110 detects the movements or the first touch input 11 and the second touch input 12 moving the first cursor 21 and the second cursor 22 simultaneously, the electronic device 100 rotates a corresponding object according to the movement. Rotating a painting is as an example as shown in FIG. 3, but the present invention is not limited thereto. A user may perform various functions, for example, text rotation, selection of painting or text, and editing of painting or text, by using the first cursor 21 and the second cursor generated by a multi-touch.

When a user releases the first touch input 11 and the second touch input 12 simultaneously, the first cursor 21 and the second cursor 22 on the touch screen 110 are released. Accordingly, the touch screen 110 may apply functions such as rotation of painting or text or selection of painting or text.

Figure 4A:
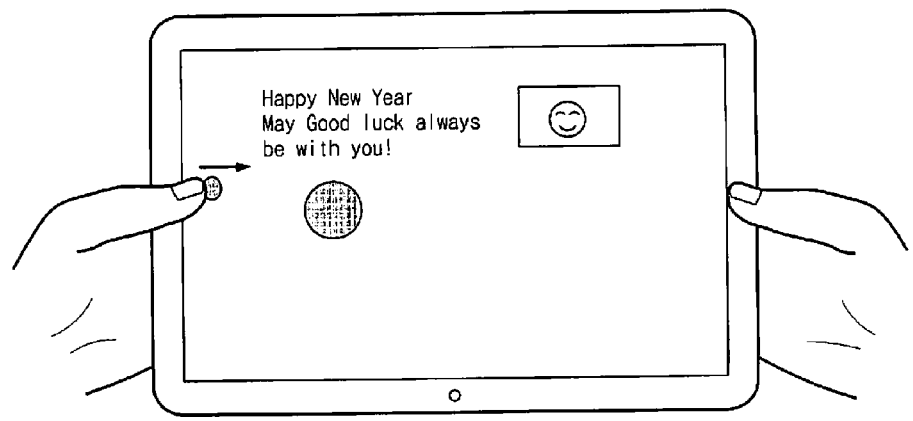
FIGS. 4A-4C are diagrams illustrating a screen for controlling a touch screen by using a cursor in an electronic device, according to an embodiment of the present invention.
Figure 4B:
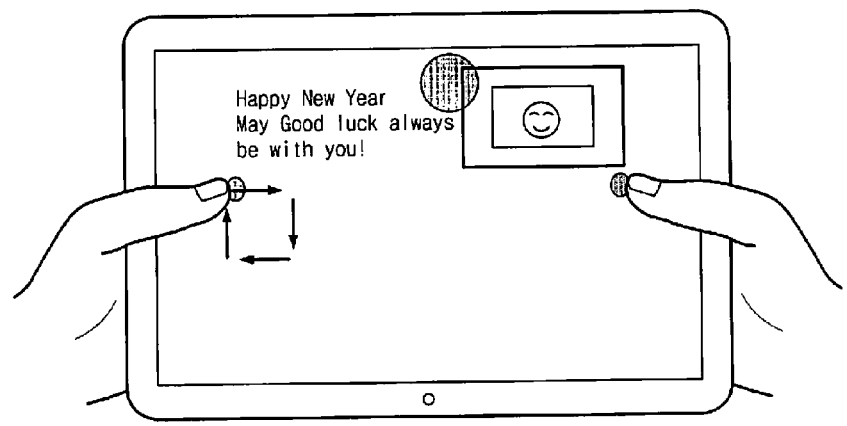
Figure 4C:
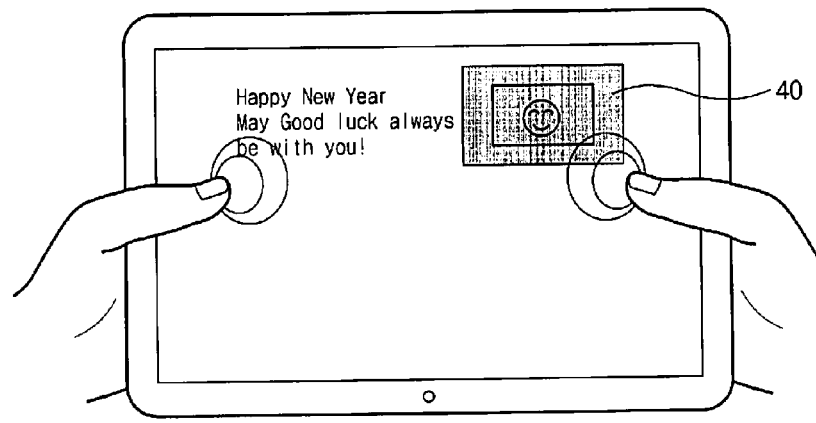

FIGS. 4A-4C are diagrams illustrating a screen for controlling the touch screen 110 by using the cursor 20 in the electronic device 100, according to an embodiment of the present invention.

The cursor 20 may be generated on the touch screen 110 by a predetermined first touch input 11, as shown in FIG. 4A. By moving the first touch input 11 in the predetermined area 30, a user may move the cursor 20 to a desired position on the touch input 110.

As shown in FIG. 4B, a user may activate an area selection function by a predetermined second touch input 12 while the cursor 20 is generated. For example, the predetermined second touch input 12 may be a long touch. The present invention is not limited thereto and a user may use double tap, drag, flick, touch & hold, panning, and sweep as the predetermined second touch input 12.

Once the area selection function is activated by the second touch input 12, a selection area 40 is drawn on the touch screen 110 according to the movement of a first cursor by the movement of the first touch input. For example, when a user moves the first touch input 11 as shown in the arrow direction of FIG. 4B, the cursor 20 moves to a corresponding position in the same form as the movement of the first touch input on the touch screen 110. Then, according to the movement of the first cursor, the selection area 40 is drawn on the touch screen 110. By moving the first touch input 11 in the same form as a desired area for selection on the touch screen 110, a user may select entire or part of an area such as text or painting on the touch screen 110.

When an area to be selected is displayed on the touch screen 110, a user releases the first touch input 11 and the second touch input 12 as shown in FIG. 4C. Accordingly, an area drawn according to the movement of the cursor 20 on the touch screen 110 may be determined as the selection area 40. The processor 110 automatically copies the area 40 selected by the release of the first touch input 11 and the second touch input 12 into a clipboard.

In such a way, a user may select a partial area of text or painting. Selecting a painting is described as an example as shown in FIGS. 4A-4C, but the present invention is not limited thereto. A user may perform various functions, for example, text rotation, selection of painting or text, and editing of painting or text, by using the cursor 20 generated by the First touch input 11 and the second touch input 12.

Figure 5A:
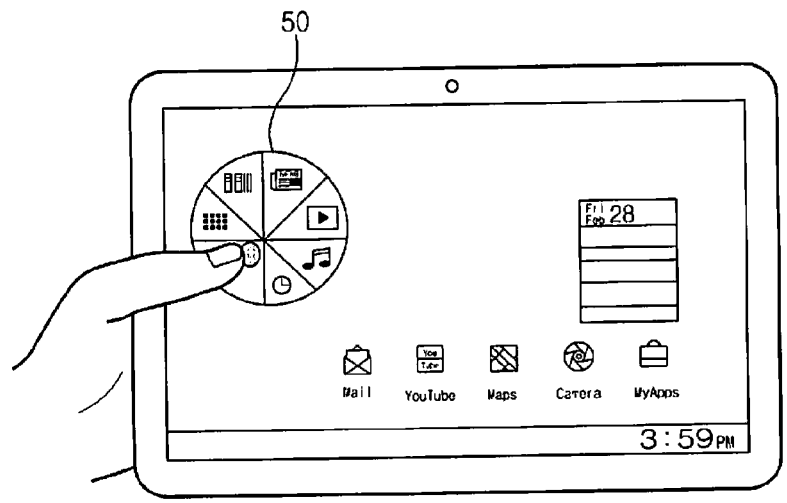
FIGS. 5A and 5B are diagrams illustrating a screen for displaying a menu relating to a content displayed on a touch screen by using touch in an electronic device, according to an embodiment of the present invention.
Figure 5B:
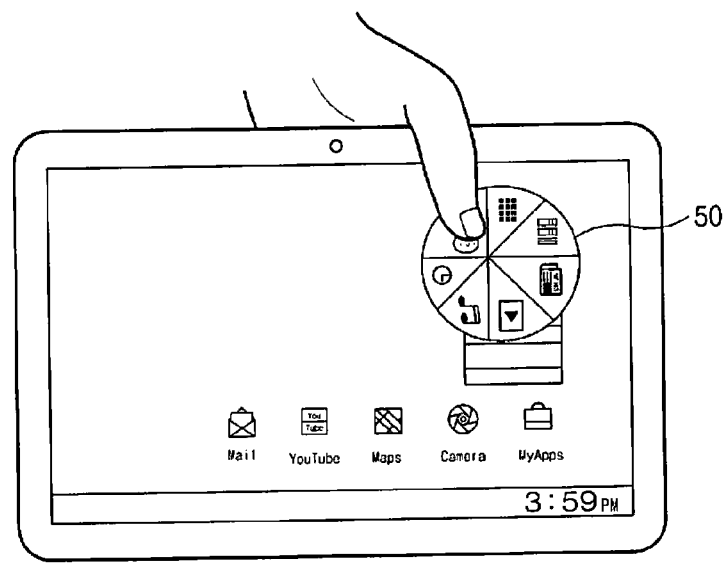

FIGS. 5A and 5B are diagrams illustrating a screen for displaying a menu relating to a content displayed on the touch screen 110 by using touch in the electronic device 100, according to an embodiment of the present invention.

Referring to FIG. 5A, a menu 50 may be generated by a user's predetermined touch input. When the touch screen 110 detects a predetermined touch input within a predetermined distance from the edge, it may display the menu 50 relating to a content displayed on the touch screen 110 at the position where the touch input occurs. For example, the predetermined touch input may be a long touch or long hold down. The predetermined touch input 10 is not limited thereto and may include different forms of touch input, for example, tap, drag, long touch, or double tap.

A user may generate the menu 50 relating to a content displayed on the touch screen 110 by touching an edge portion of the touch screen 110 by the left thumb while gripping the electronic device 100. Since it is difficult for a user to control the wide touch screen 110 by a finger while gripping the electronic device 100, the touch screen 110 provides the menu 50 actively according to the displayed content, so that space utilization may be increased. Accordingly, a user may control various functions of the touch screen 110 only with a movement on a small area.

Additionally, unlike a typical menu displaying a menu with a fixed position and a fixed form, the touch screen 110 displays the menu 50 changed according to content at the position where the touch input 10 occurs. The touch screen 110 displays a menu at a position that a user wants or at a position where user's manipulation is convenient. Accordingly, the electronic device 100 may provide user-friendly UI and UX to a user.

When a user performs the predetermined touch input 10 generating the menu 50, the menu 50 relating to a content displayed on the touch screen 110 may be displayed at the position where the touch input 10 occurs. The menu 50 may vary according to a content that the touch screen 110 displays. For example, when a movie is played on the touch screen 110, as menu relating to movie playback, for example, play, pause, fast forward and rewind, may be displayed by the touch input 10 at the position where the touch input 10 occurs. As another example, when the camera module 140 (fair example, a capturing function) is executed on the touch screen 110, a menu relating to photo shooting, for example, focus, exposure, white balance, and zoom, may be displayed by the touch input 10 at the position where the touch input 10 occurs.

FIG. 5B illustrates a touch input occurring at a different position than FIG. 5A. As shown in FIG. 5B, the touch screen 110 displays the menu 50 at the position where the touch input 10 occurs. Accordingly, a user may display on the touch screen 110 a menu relating to a content of the touch screen 110 at the position that a user wants or at the position where user's manipulation is convenient.

Figure 6A:
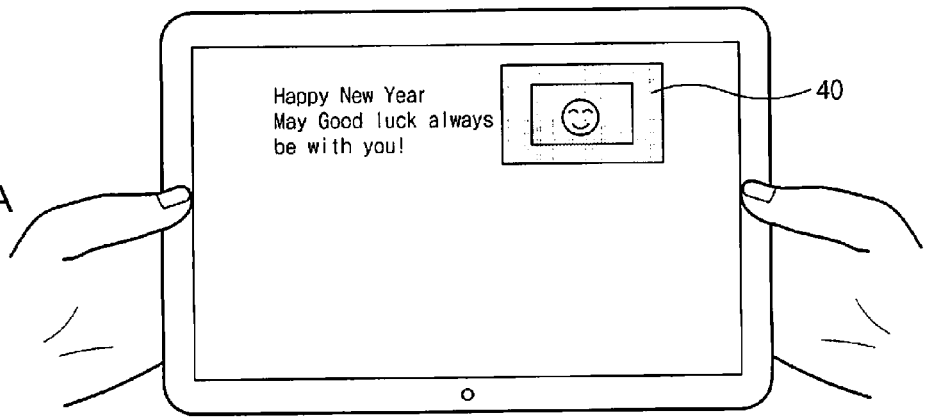
FIGS. 6A-6C are diagrams illustrating a screen for displaying a menu relating to a content displayed on a touch screen by using touch in an electronic device, according to an embodiment of the present invention.
Figure 6B:
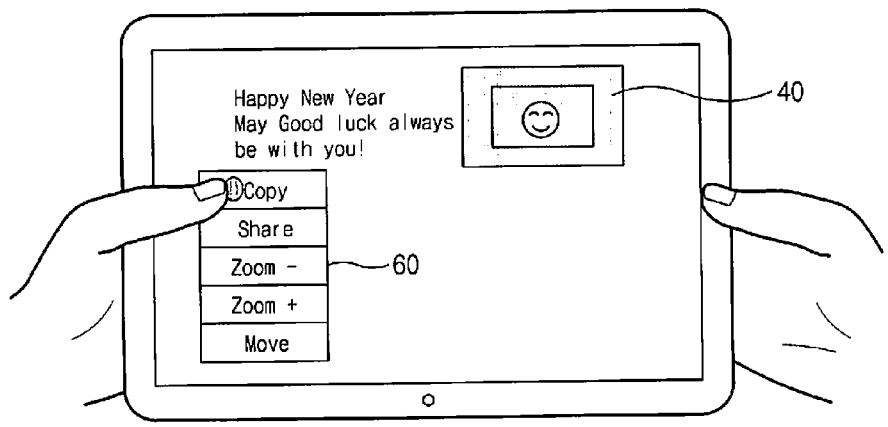
Figure 6C:
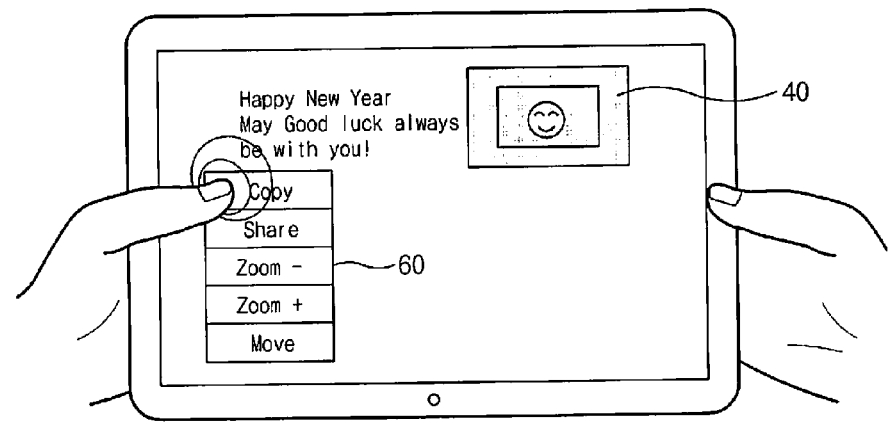

FIGS. 6A-6C are diagrams illustrating a screen for displaying a menu relating to a content displayed on the touch screen 110 by using touch in the electronic device 100, according to an embodiment of the present invention.

Referring to FIG. 6A, the touch screen 110 displays a selection area 40 selected by an area selection function.

Referring to FIG. 6B, a user may perform a predetermined touch input 10 generating a menu 60 on a screen where the selection area 40 of FIG. 6A is displayed. Accordingly, the menu 60 relating to a content displayed on the touch screen 110 may be displayed at the position where the touch input 10 occurs. The touch screen 110 displays a menu relating to the selection area 40 displayed on the touch screen 110. Referring to FIG. 6B, the menu 60 includes functions for editing the selection area 40, for example, copy, share, zoom−, zoom+, and move.

Referring to FIG. 6C the touch screen 110 detects a movement of a touch input on the menu 60 and selects an item displayed at the position the touch input is released. When a user releases the touch input 10 after moving the touch input 10 to "copy", "copy" is displayed at the position where the touch input 10 is released may be selected. Accordingly, the processor 110 copies the selection area 40, or, when a user releases the touch input 10 after moving the touch input 10 to "zoom+", "zoom+," that is, an item displayed at the position where the touch input 10 is released, may be applied to the selection area 40.

Figure 7:
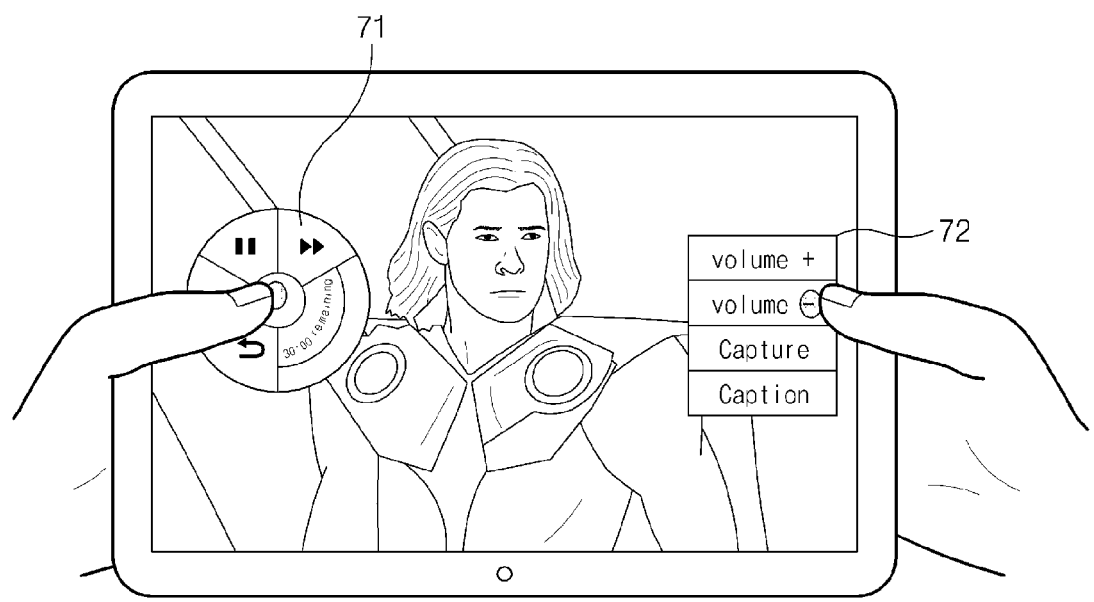
FIG. 7 is a diagram illustrating a screen for displaying a menu relating to a content displayed on a touch screen by using multi-touch in an electronic device, according to an embodiment of the present invention.

FIG. 7 is a diagram illustrating a screen for displaying a menu relating to a content displayed on the touch screen 110 by using multi-touch in the electronic device 100, according to an embodiment of the present invention.

As described with reference to FIGS. 5A and 5B, the touch screen 110 displays a first menu 71 relating to a content displayed on the touch screen 110 by a user's predetermined first touch input 11 at the position where the first touch input 11 occurs. A user displays a second menu 72 relating to the content at the position where the second touch input 12 occurs by using the opposite linger in the same manner.

Since the touch screen 110 plays a movie currently, the first menu 71 and the second menu 72 generated by multi-touch may display different menus relating to the movie.

Referring to FIG. 7, the first menu 71 includes functions relating to movie playback, for example, play, pause, fast forward and rewind, at the position where the first touch input 10 occurs. The second menu 72 includes other functions relating to movie playback, for example, volume+, volume− capture, and caption, at the position where the second touch input 12 occurs.

When a user touches an edge portion of the touch screen 110 by the left thumb while gripping the electronic device 100, the first menu 71 relating to a movie playback may be displayed at a position where the first touch input 11 occurs. Then, when a user touches an edge portion of the touch screen 110 by the right thumb, the second menu 72 relating to a movie playback may be displayed at the position where the second touch input 12 occurs.

Figure 8A:
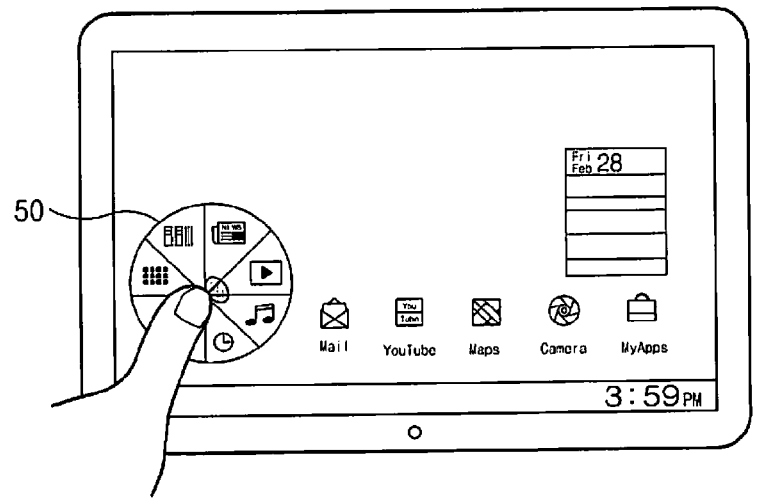
FIGS. 8A-8C are diagrams illustrating a screen for displaying a menu relating to a content displayed on a touch screen by using touch in an electronic device, according to an embodiment of the present invention.
Figure 8B:
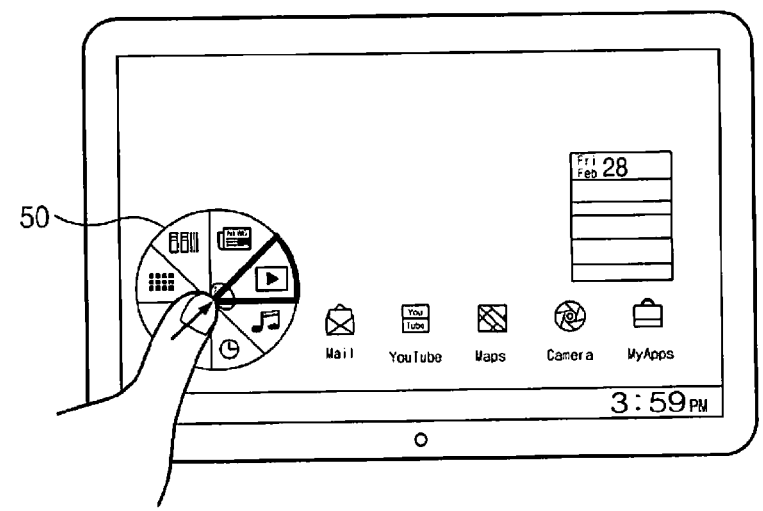
Figure 8C:
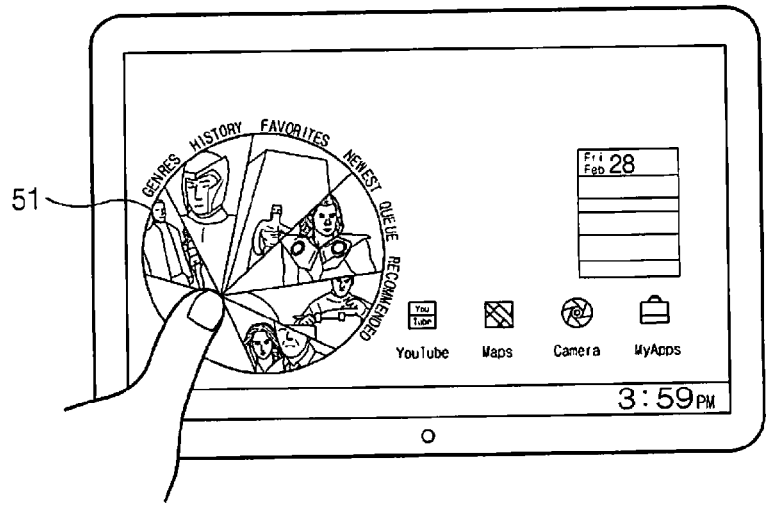

FIGS. 8A-8C are diagrams illustrating a screen for displaying a menu relating to a content displayed on the touch screen 110 by using touch in the electronic device 100, according to an embodiment of the present invention.

The electronic device 100 determines whether an option (or an item) of a menu displayed on the touch screen 110 is selected and determines whether there is a sub menu for the selected option (or item). If there is no sub menu for the selected option (or item), the processor 120 performs an operation according to the selected option. If there is a sub menu for the selected option (or item), the processor 120 controls the touch screen 110 thereby displaying a sub menu for the selected option.

Referring to FIG. 8A as described with reference to FIGS. 5A and 5B, by a user's predetermined touch input 10, a first menu 50 relating to a content displayed on the touch screen 110 may be generated at the position where the touch input 10 occurs. According to this embodiment, since the touch screen 110 displays a background screen, it may display the first menu 50 relating to the background screen at the position where the touch input 10 occurs.

Referring to FIG. 8B, a user may move the touch input 10 on the first menu 50 while not releasing the touch input 10. The touch screen 110 detects a movement of a touch input on the first menu 50.

As shown in FIG. 8C when the touch input 10 moves to an item displayed on the first menu 50 and the item displayed at the position where the touch input 10 moves includes a sub menu relating to a corresponding item, the touch screen 110 changes the first menu 50 to a second sub menu 51 relating to a corresponding item and may then display it.

For example, the first menu 50, as shown in FIG. 8A, includes a content relating to the background screen, for example, movie playback, music playback, news watching, search, scheduling, and contact. When the touch input 10 moves to an item of movie playback, the touch screen 10 changes the first menu 50 into the second sub menu 51 including a playable movie list.

In such a way, a first menu displayed by the touch input 10 displays a second sub menu of a corresponding item by a selection of a first item and displays a third sub menu by a selection of a second item from the second sub menu. In such a way, the touch screen 110 displays a first menu generated by the touch input 10 as a multi-level menu displaying menus in the steps of a second sub menu and a third sub menu.

Figure 9A:
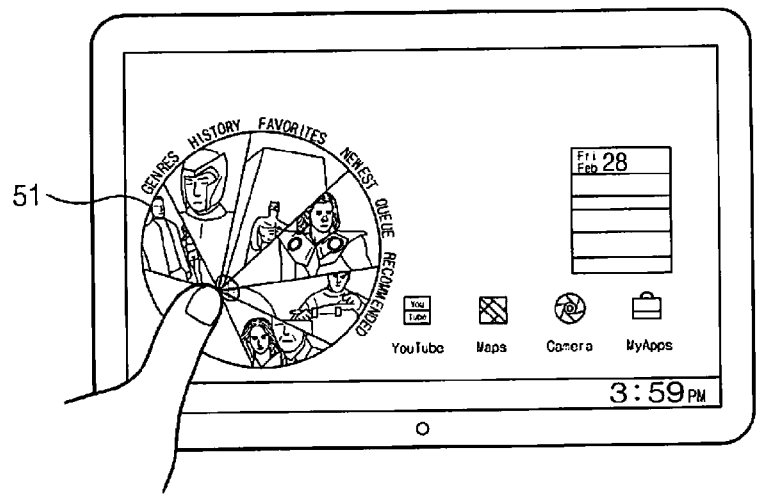
FIGS. 9A-9C are diagrams illustrating a screen for displaying a menu relating to a content displayed on a touch screen by using touch in an electronic device, according to an embodiment of the present invention.
Figure 9B:
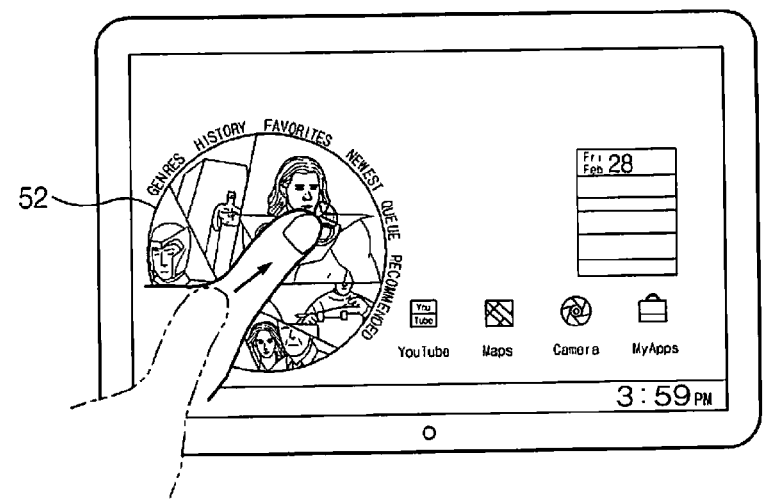
Figure 9C:
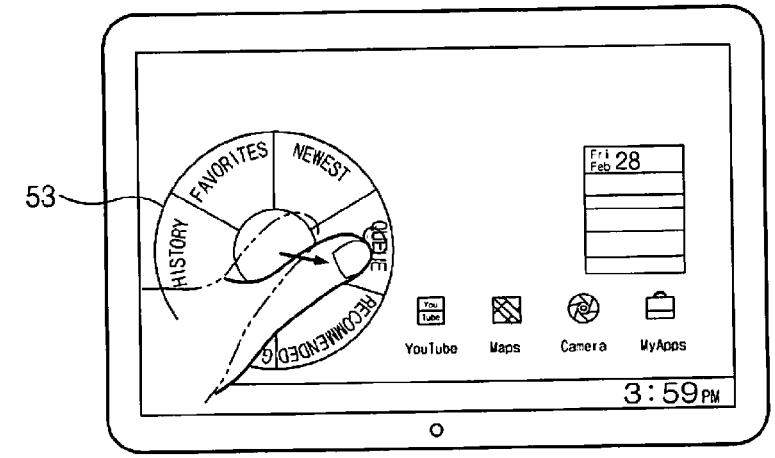

FIGS. 9A-9C are diagrams illustrating a screen for displaying a menu relating to a content displayed on the touch screen 110 by using touch in the electronic device 100, according to an embodiment of the present invention.

When a first item of the first menu is selected by a movement of the first touch input on the touch screen 110, the electronic device 100 displays a different form of the first menu at the position of the first menu.

FIG. 9A illustrates a second sub menu 51 of the first menu 50 shown in FIG. 9C.

Referring to FIG. 9B, when the touch input 10 moves to an item displayed on the second sub menu 51, the touch screen 110 displays a changed form (for example, zoom+) of an item displayed at the position where the touch input moves so as to allow a user to see the selected item well. A second menu shown in FIG. 9B has a changed form 52 of the second sub menu 51.

Alternatively, the second sub menu 51 displays a second menu for changing items of the second sub menu 51 into different items. For example, as shown in FIG. 9B, a second menu of "genres, history, favorite, newest, queue, and recommended" may be displayed outside the second sub menu 51. When attempting to select another item other than the items displayed on the second sub menu 51, a user moves the touch input 10 on the second menu to display other items on the second sub menu 51.

Alternatively, as shown in FIG. 9C, when the touch input 10 moves to an item displayed on the second menu through the second sub menu 51, the touch screen 110 changes the second sub menu 51 into the second menu to allow a user to see the second menu. The second menu shown in FIG. 9C has a changed form 53 of the second menu to allow a user to see the second menu.

For example, the touch screen 110 changes the second menu of "genres, history, favorite, newest, queue, and rec-ommended" outside the second sub menu 51 and displays it at the position of the second sub menu 51, as shown in FIG. 9C.

Thus, without releasing the touch input 10, a user may select various menus by one touch through a multi-level menu.

FIGS. 10A-10D are diagrams illustrating a screen for displaying a menu relating to a content displayed on the touch screen 110 by using multi-touch in the electronic device 100, according to an embodiment of the present invention.

Figure 10B:
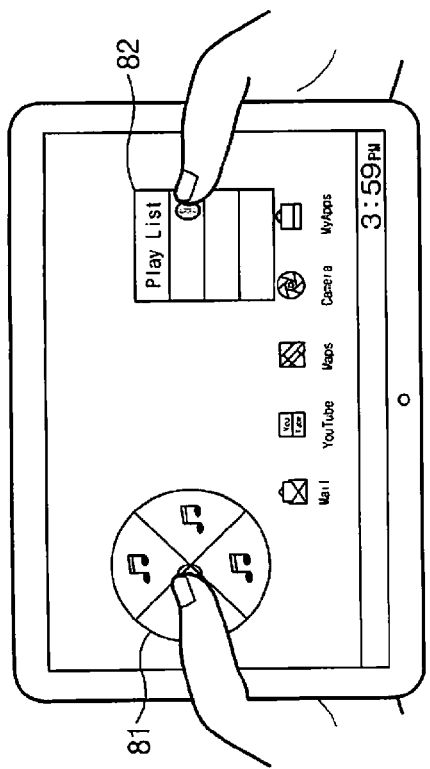
FIGS. 10A-10D are diagrams illustrating a screen for displaying a menu relating to a content displayed on a touch screen by using multi-touch hi an electronic device, according to an embodiment of the present invention.
Figure 10D:
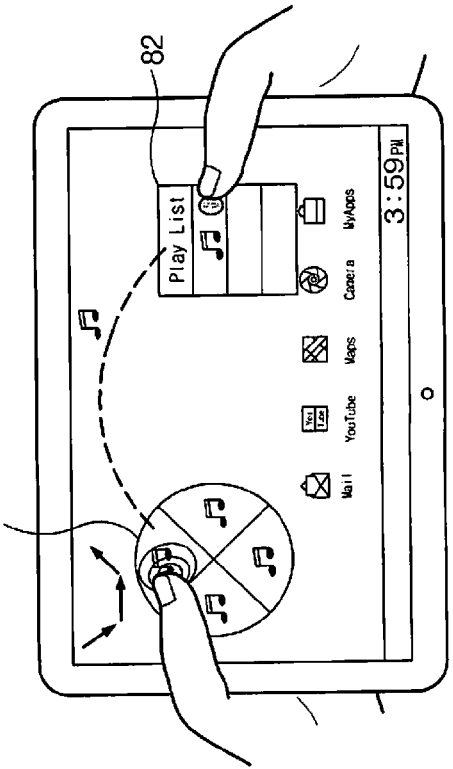
Figure 10A:
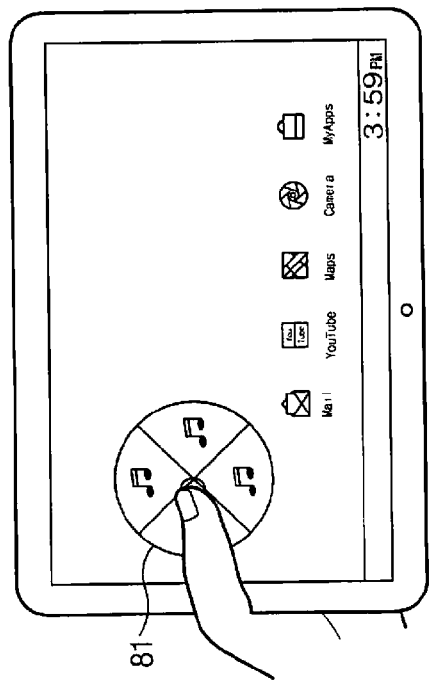

As shown in FIG. 10A, the touch screen 110 displays a menu generated by a user's first touch input 11 or a first menu 81 corresponding to a sub menu of the menu. For example, the first menu 81 may be a playable song list.

As shown in FIG. 10B, a new second menu 82 may be generated by a user's predetermined second touch input 12 at the position where the second touch input 12 occurs. The second menu 82 displays items relating to a content displayed on the first menu 81.

For example, the second menu 82, as a menu displayed by the second touch input 12, may be a play list of a song player that plays songs displayed in the first menu 81.

Figure 10C:
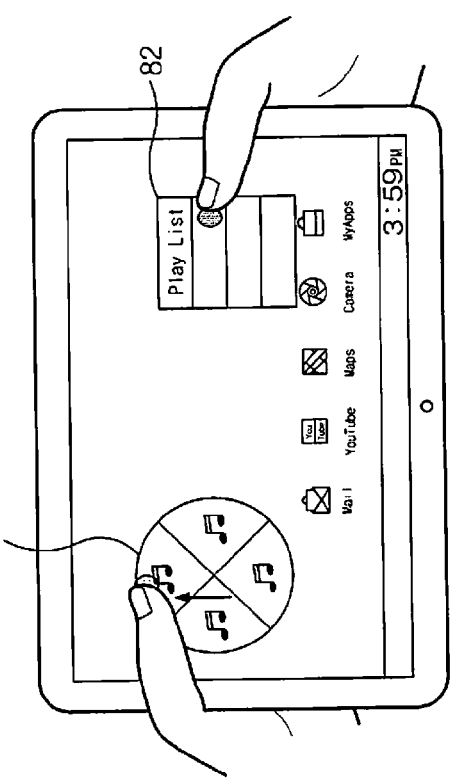

As shown in FIG. 10C, by moving the touch input 11 to a desired item in the first menu 81, the desired item may be selected.

As shown in FIG. 10B, the touch screen 110 moves an item between the first menu 81 and the second menu 82. A user may move the first touch input 11 on a first item of the first menu 81 and then may release the first item toward the second menu 82 in a predetermined form of release. Accordingly, the first item displayed in the first menu 81 may be included as an item of the second menu 82. For example, a predetermined form of release of the first touch input may be flick. The present invention is not limited thereto and a user may use double tap, panning, and sweep as a predetermined form of release of the second touch input 11.

For example, when a user releases a song displayed in the first menu 81 toward the second menu 82 in a predetermined form of release, so that the song may be included in the playlist of the second menu 82.

Figure 11A:
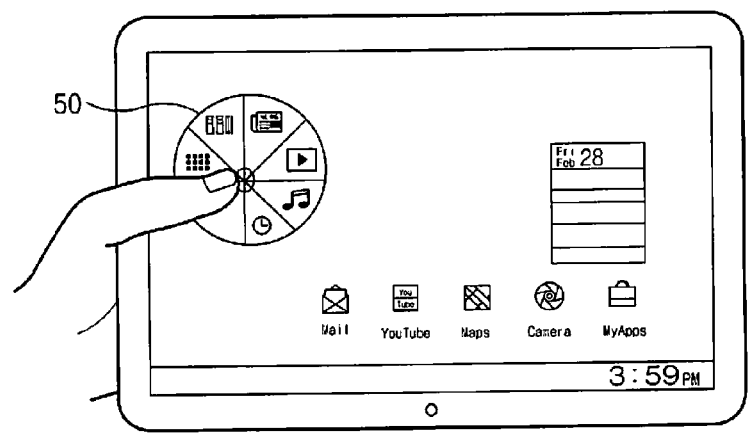
FIGS. 11A-11C are diagrams illustrating a screen using a multi touch and a shortcut in an electronic device, according to an embodiment of the present invention.
Figure 11B:
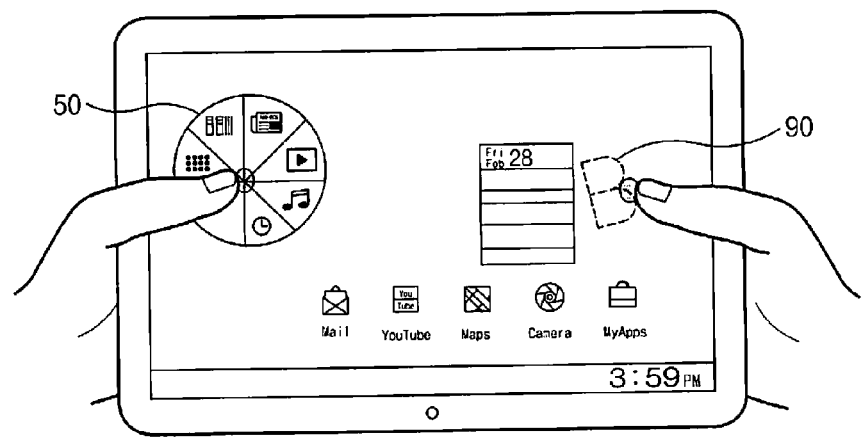
Figure 11C:
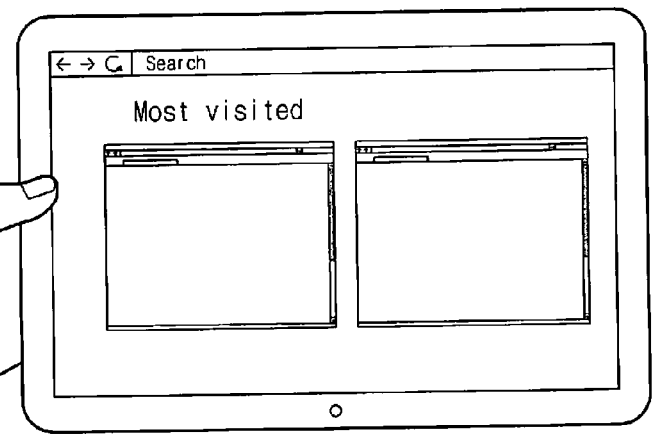

FIGS. 11A-11C are diagrams illustrating a screen using a multi touch and a shortcut in the electronic device 100, according to an embodiment of the present invention.

The electronic device 100 detects a second touch input corresponding to text drawing on the touch screen and executes a shortcut that the text represent in relation to the first menu displayed on the touch screen.

As shown in to FIG. 11A, a first menu 50 relating to a content displayed on the touch screen 110 racy be displayed by a user's predetermined first touch input 11 at the position where the first touch input 11 occurs.

Referring to FIG. 11B, a user may perform a predetermined second touch input 12 while maintaining the first touch input 11 displaying the first menu 50 on the touch screen 110. The predetermined second touch input 12 may be drawing a predefined picture, number or character or a predetermined gesture. For example, as shown in FIG. 11B, while the first menu 50 is displayed, when a user draws the letter B 90 by using the second touch input 12, the touch screen 110 displays a menu pre-allocated to the alphabet B.

Referring to FIG. 11C, the touch screen 110 displays a web browser corresponding, to a shortcut that the letter B indicates on the touch screen 110.

Figure 12A:
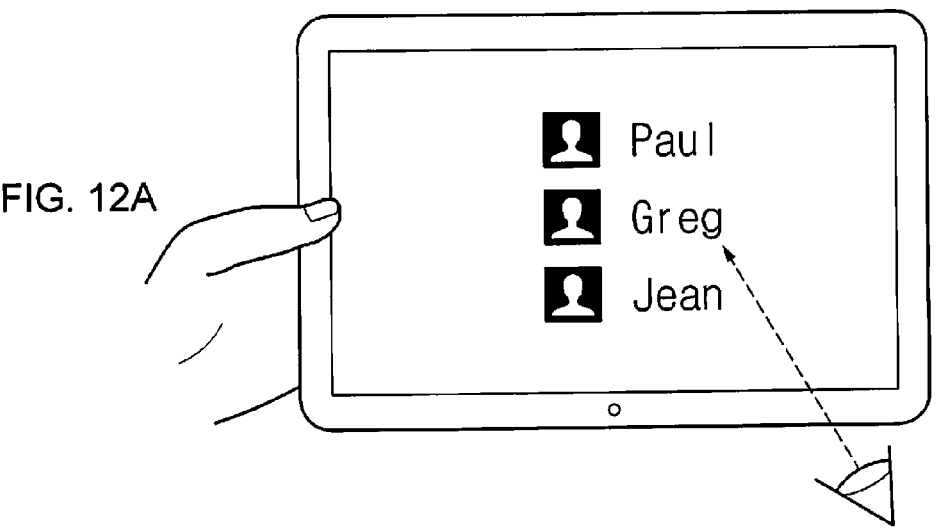
FIGS. 12A and 12B are diagrams illustrating a screen for displaying a menu by using a user's touch and gaze in an electronic device, according to an embodiment of the present invention.
Figure 12B:
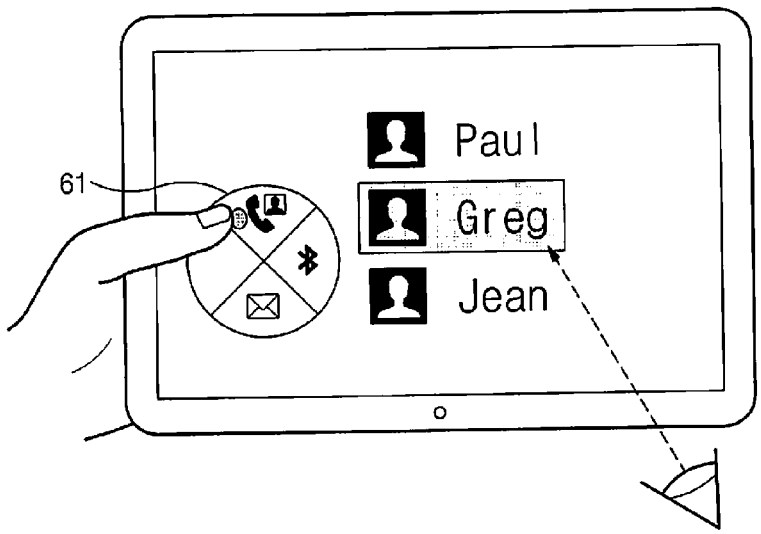

FIGS. 12A and 12B are diagrams illustrating a screen for displaying a menu by using a user's touch and gaze in the electronic device 100, according to an embodiment of the present invention.

The electronic device 100 detects a user's gazing position, and, if there is an item applicable to the first menu at the user's gazing position, an item displayed at the position where the first touch input is released may be applied to the item at the user's gazing position.

As shown in FIG. 12A, a user may gaze at a predetermined item in a list displayed on the touch screen 110. The touch screen 110 identifies a user's gazing item by using the camera module 140.

For example, as shown in FIG. 12A, the touch screen 110 displays names registered in a contact list. A user may select a corresponding name in the contact list by gazing at the name that the user wants to contact in the contact list.

Referring to FIG. 12B, while gazing at a predetermined item, a user may perform the predetermined first touch input 11 by a finger. The touch screen 110 displays a first menu 61 relating to a content displayed on the touch screen 110 by the first touch input 11 at the position where the first touch input 11 occurs. When the first touch input 11 moves on one of items in the first menu 61, i.e., selects one of the items, and then releases the selected item, the electronic device 100 applies the selected item from the first menu 61 to the user's gazing item.

For example, the first menu 61 includes a function such as dialing, Bluetooth connection, and mail relating to a contact list displayed on the touch screen 110. When a user selects a dialing function by moving the first touch input 11 on the first menu 61, the electronic device 100 calls the name that was gazed on in the contact list.

In such a way, while a user gazes at a specific item and a predetermined touch input activating a menu is received, the electronic device 100 displays a menu relating to the item on a touch screen and applies the item selected from the menu to the user's gazing item.

Figure 13A:
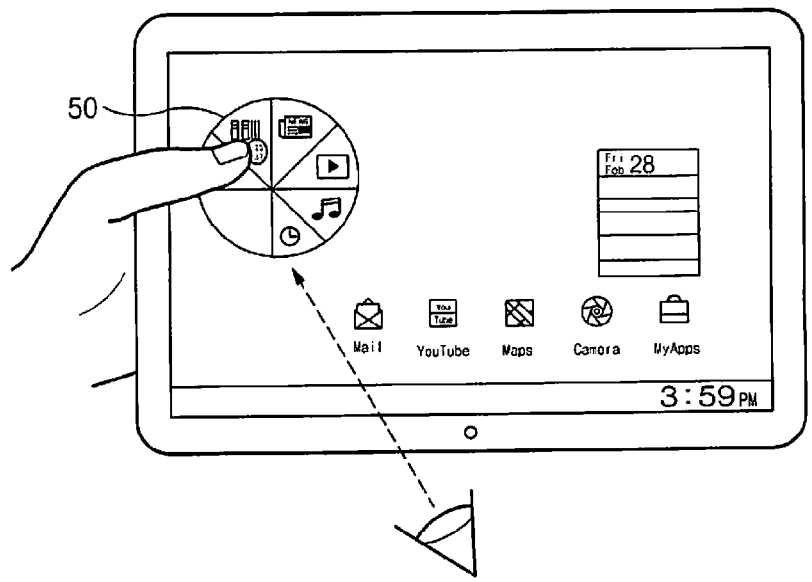
FIGS. 13A and 13B are diagrams illustrating a screen for selecting a control means by using a user's gaze in an electronic device, according to an embodiment of the present invention.
Figure 13B:
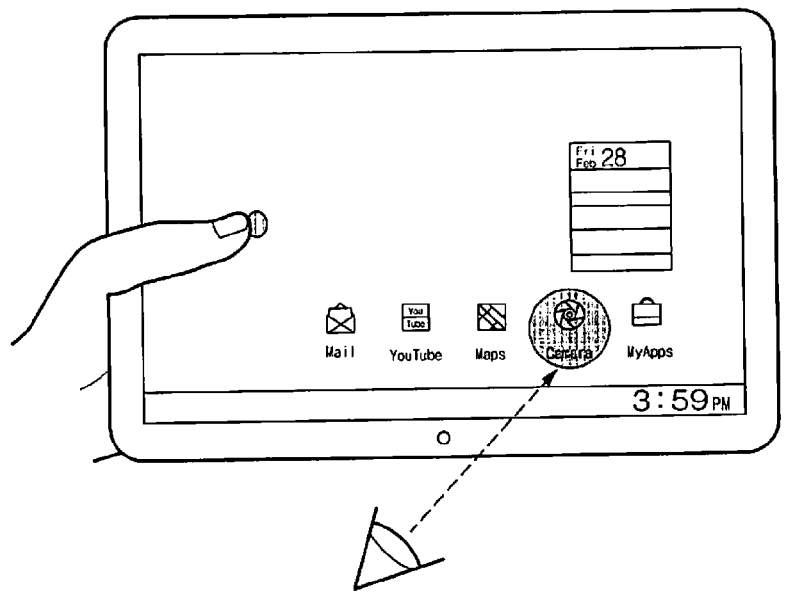

FIGS. 13A and 13B are diagrams illustrating a screen for selecting a control means by using a user's gaze in the electronic device 100, according to an embodiment of the present invention.

The camera module 140 detects the user's gazing position in response to a touch input. The processor 120 controls the touch screen 110 on the basis of a user's gazing position.

Referring to FIG. 13A, when the user's gazing position is identical to the position of a touch input, the touch screen 110 displays a menu 50 relating to a content displayed on the touch screen 110 at the position of the touch input.

Referring to FIG. 13B, when the user's gazing position is spaced from the position of a touch input, a cursor 20 may be displayed at the user's gazing position on the touch screen 110.

Figure 14A:
FIGS. 14A-14C are diagrams illustrating a screen for controlling a main screen and a sub screen by using a user's gaze in an electronic device, according to an embodiment of the present invention.
Figure 14B:
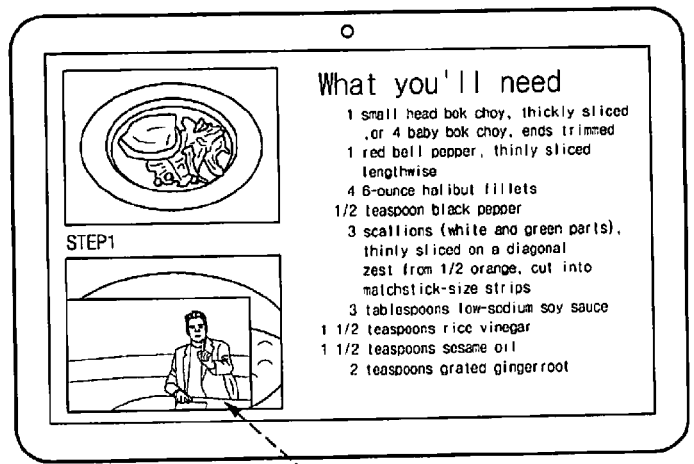
Figure 14B:
Figure 14C:
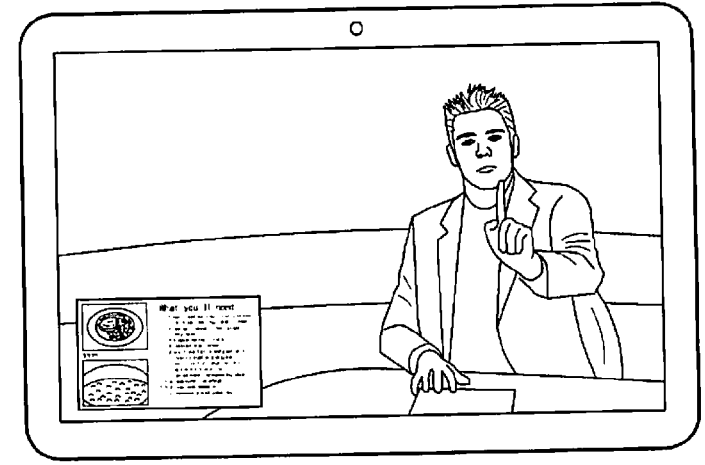

FIGS. 14A-14C are diagrams illustrating a screen for controlling a main screen and a sub screen by using a user's gaze in the electronic device 100, according to an embodiment of the present invention.

Referring to FIG. 14A, the touch screen 110 displays two screens, that is, a main screen and a sub screen. In the touch screen 110, a main screen displays a webpage on an entire screen and a sub screen plays a video at the left bottom.

Referring to FIG. 14B, by detecting a user's gazing from among the main screen and the sub screen through the camera module 140, the main screen and the sub screen may be controlled. For example, when it is detected that the camera module 140 is maintained on a sub screen at the left bottom for more than a predetermined time, the processor 120 displays a video of the sub screen on the main screen and controls the touch screen 110, thereby displaying a webpage of the main screen as the sub screen.

FIGS. 15A-15D are diagrams illustrating a screen for capturing a picture by using multi-touch in the electronic device 100, according to an embodiment of the present invention.

Figure 15B:
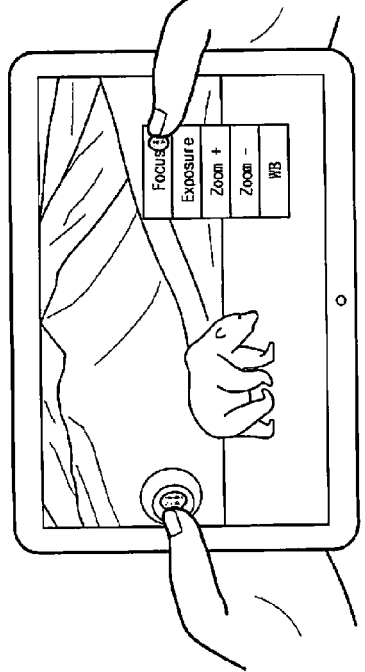
FIGS. 15A-15D are diagrams illustrating a screen for capturing a picture by using multi-touch in an electronic device, according to an embodiment of the present invention.
Figure 15D:
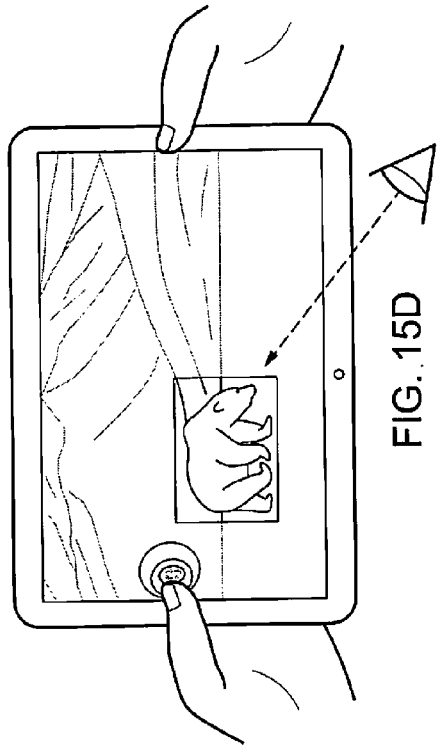
Figure 15A:
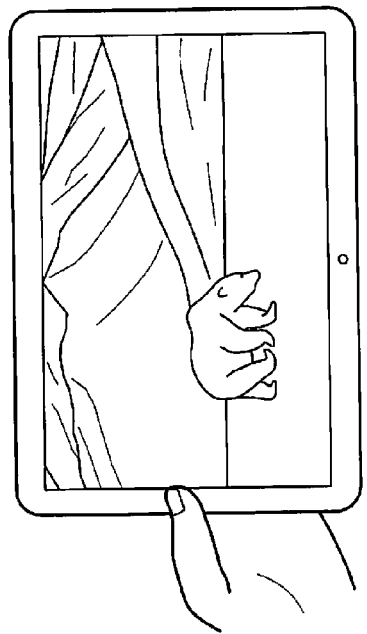

Referring to FIG. 15A, a picture capturing mode is executed on the touch screen 110.

Referring to FIG. 15B, when a predetermined first touch input is detected from the touch screen 110, a first menu relating to the picture capturing mode displayed on the touch screen 110 may be displayed. For example, the first menu displays a menu relating to picture capturing, for example, focus, exposure, zoom+, and zoom−.

A user may move the first touch input to one of items displayed in the first menu and may then release it. Accordingly, an item displayed at the position that the first touch input is released may be selected on the touch screen 110. For example, a user may select a focus by moving the first touch input in the first menu of the picture capturing mode, thereby setting the focus by using, a user's gaze in the picture capturing mode, or a user may select an exposure by moving the first touch input in the first menu of the picture capturing mode, thereby setting the exposure by using a user's gaze in the picture capturing mode.

Figure 15C:
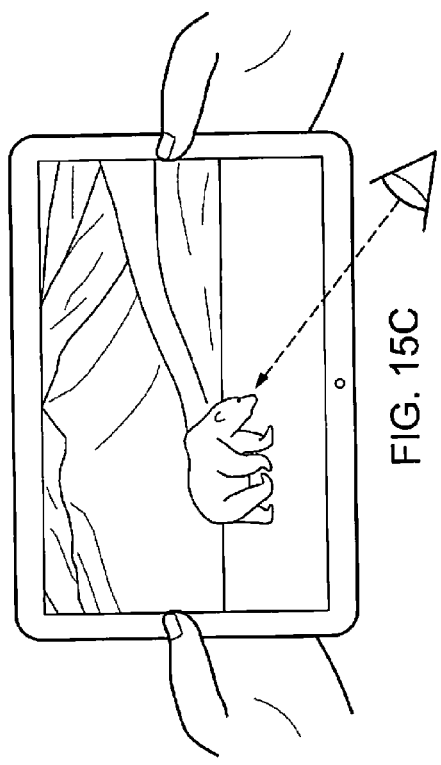

Referring to FIG. 15C, the camera module 140 determines a user's gazing area in a preview screen displayed on the touch screen 110. For example, the camera module 140 detects that a user gazes at a polar bear in a preview mode.

Referring to FIG. 15D, the touch screen 110 applies a function selected from the first menu to a user's gazing area. For example, as shown in FIG. 15D, the polar bear which the user gazes upon may be focused. When a user performs a predetermined second touch input, picture capturing may be performed on the focused polar bear.

Figure 16A:
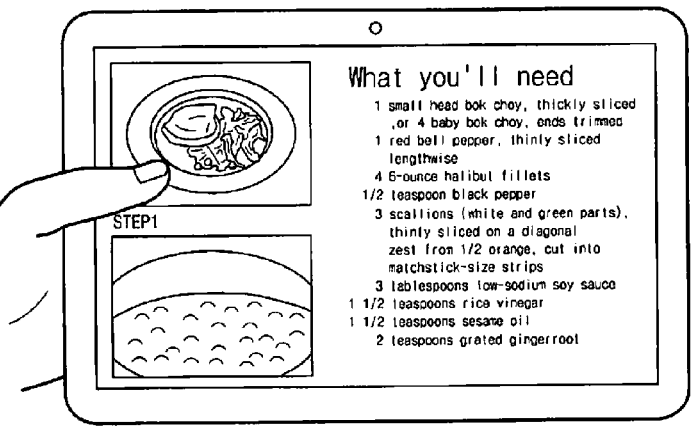
FIGS. 16A-16C are diagrams illustrating a screen for controlling a touch screen by using proximity and gesture in an electronic device, according to an embodiment or the present invention.
Figure 16B:
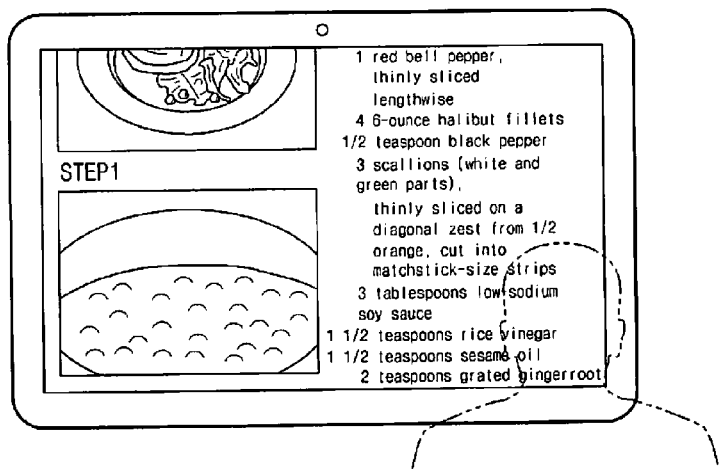
Figure 16C:
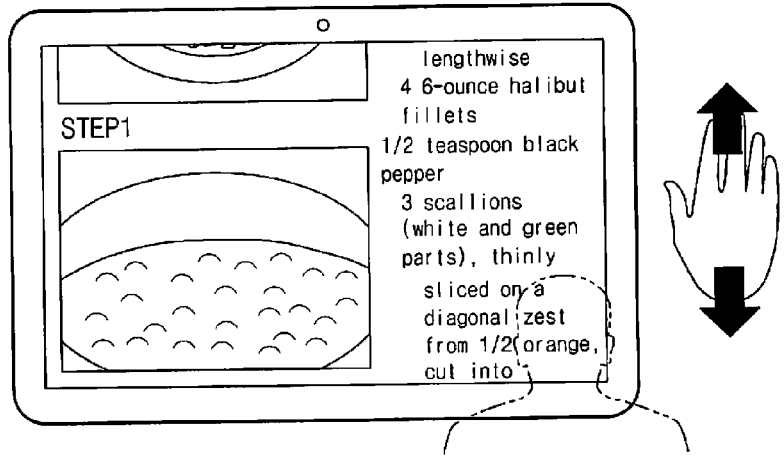

FIGS. 16A-16C are diagrams illustrating a screen for controlling the touch screen 110 by using proximity and gesture in the electronic device 100, according to an embodiment of the present invention.

The electronic device 100 detects a distance from the electronic device 100 to a user by using one or more sensors provided in the electronic device 100. The electronic device 100 adjusts a size or ratio of a content displayed on the touch screen 110 in proportion to the distance.

FIG. 16A illustrates a case that a user grips the electronic device 100. FIG. 16A may also illustrate a case where a user is close to the electronic device 100.

FIG. 16B illustrates a case where a user is far from the electronic device 100. The electronic device 100 detects that a user is far from the electronic device 100 and automatically enlarges a screen displayed on the touch screen 110 by a predetermined ratio.

FIG. 16C illustrates a case where a use is spaced very far away from the electronic device 100. The electronic device 100 enlarges a display screen on the touch screen 110 in proportion to a distance between a user and the electronic device 100. While the screen is enlarged on the touch screen, a user may scroll the enlarged screen by using a gesture.

Figure 17:
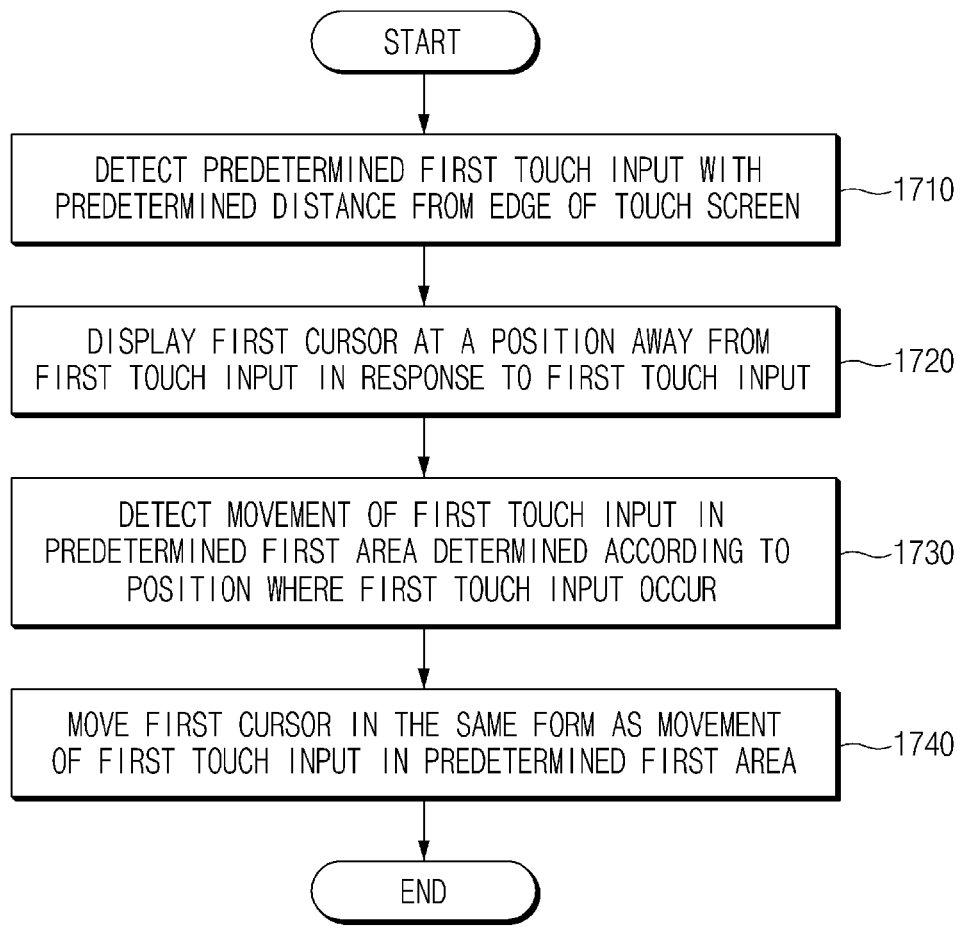
FIG. 17 is a flowchart illustrating a method or providing a user interface in an electronic device, according to an embodiment of the present invention.

FIG. 17 is a flowchart illustrating a method of providing a user interface in the electronic device 100, according to an embodiment of the present invention. The method of FIG. 17 is configured with operations processed in the electronic device 100 of FIG. 1. Accordingly, even omitted contents, which are described for the electronic device 100 shown in FIG. 1, may be applied to the method of FIG. 17, and the method of FIGS. 18-20, which are described below.

At step 1710, the touch screen 110 detects a predetermined first touch input within a predetermined distance from the edge of the touch screen 110.

At step 1720, the touch screen 110 displays a first cursor at a position spaced away from the first touch input in response to the first touch input.

At step 1730, the touch screen 110 detects a movement of the first touch input in a first predetermined area mapped into an entire screen of the touch screen and determined according to the position where the first touch input occurs.

At step 1740, the touch screen 110 moves the first cursor in the same form as the movement of the first touch input in the first predetermined area.

When the first touch input is released on the touch screen 110, the processor 120 selects an item displayed at the position of the first cursor on the touch screen 110 at the time that the first touch input is released. For example, the predetermined first touch input may be swipe and hold.

The touch screen 110 detects a second touch input within a predetermined distance from the edge of the touch screen 110 and displays a second cursor spaced away from the second touch input on the touch screen 110 in response to the second touch input. The touch screen 110 detects a movement of second touch input in a second predetermined area on the touch screen 110, which is mapped into an entire screen of the touch screen and determined according to the position where the second touch input occurs. The touch screen 110 moves the second cursor in the same form as the movement of the second touch input in the second predetermined area. Furthermore, when the first cursor and the second cursor are disposed on the same object of the touch screen 110 and the first touch input and the second touch input moving the first cursor and the second cursor simultaneously are detected, the processor 120 rotates the object.

The touch screen 110 detects a predetermined second touch input for activating an area selection function and displays a selection area on the touch screen 110 according to a movement of the first cursor by a movement of the first touch input. Furthermore, the touch screen 110 detects a predetermined third touch input within a predetermined distance from the edge of the touch screen 110 and displays a menu relating to the selection area on the touch screen.

The camera module 140 detects a user's gazing position and, the user's gazing position is spaced from the position of the first touch input, the touch screen 10 displays the first cursor at the user's gazing position, or, if the user's gazing, position is identical to the position of the first touch input, the touch screen 110 removes the first cursor and displays a first menu relating to a content displayed on the touch screen, at the position of the first touch input.

The touch screen 110 detects a movement of the first touch input on the first menu and, when the first touch input is released, applies an item displayed at the position where the first touch input is released to the content.

When the first menu is a multi-level menu, the touch screen 10 displays a sub menu of the item at the position of the first menu through an item selection on the first menu.

When a first item of the first menu is selected by a movement of the first touch input, the touch screen 110 displays the first menu in a different form at the position of the first menu.

The touch screen 110 detects a predetermined second touch input, removes the first cursor in response to the second touch input, and displays a first menu relating to a content displayed on the touch screen, at the position of the first touch input. If there is a second menu relating to the content, the touch screen 110 displays the second menu at the position where the second touch input occurs. Furthermore, when the first item of the first menu is released in a predetermined form toward the second menu, the touch screen 110 delivers the first item from the first menu to the second menu. For example, the predetermined form of release may be flick. However, the present invention is not limited thereto and the predetermined form of release may be tap, touch & hold, double tap, panning, or sweep.

The touch screen 110 detects a second touch input corresponding to drawing text on the touch screen and executes a shortcut that the text indicates in relation to the first menu.

The camera module 140 detects a user's gazing position, and, if there is an item applicable to the first menu at the user's gazing position, the processor 120 applies an item displayed at the position where the first touch input is released to the item at the user's gazing position.

Figure 18:
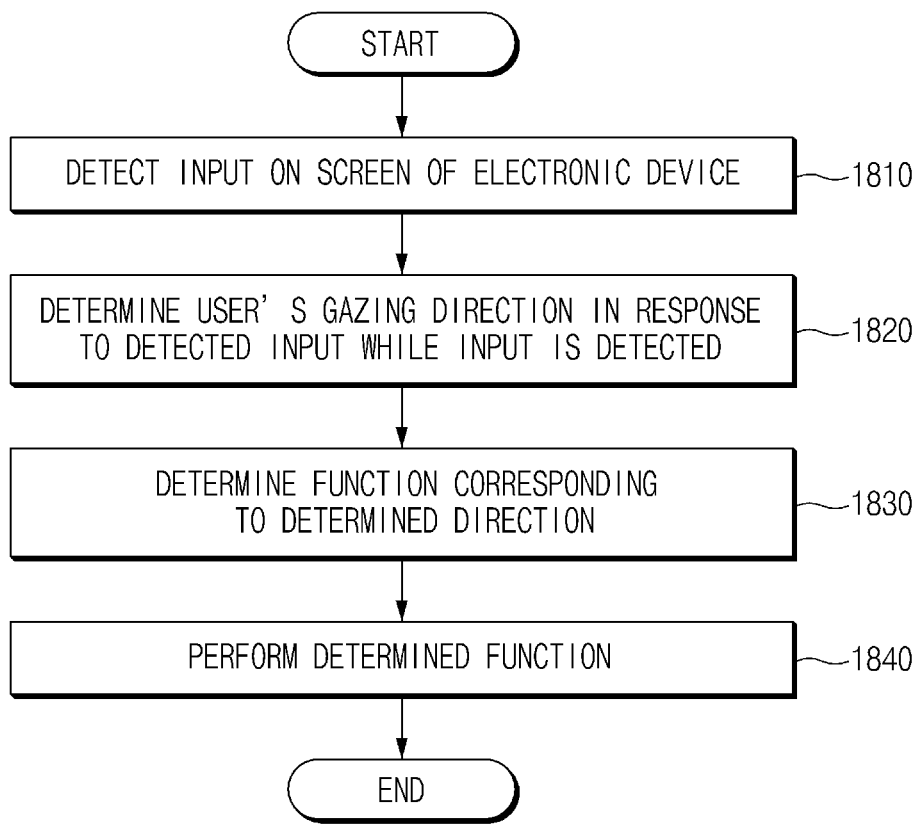
FIG. 18 is a flowchart illustrating a method of providing a user interface in an electronic device, according to an embodiment of the present invention.

FIG. 18 is a flowchart illustrating a method of providing a user interface in the electronic device 100, according to an embodiment of the present invention.

At step 1810, the touch screen 110 detects an input of the electronic device 100.

At step 1820, while the input is detected, the processor 120 determines a user's gazing direction in response to the detected input.

At step 1830, the processor 120 determines a function corresponding to the determined direction.

At step 1840, the processor 120 performs the determined function.

The processor 120 determines whether the user's gazing direction is toward the detected input area and determines the function on the basis of whether the user's gazing direction is toward the detected input area.

The touch screen 110 detects a second input, and, when the direction of the user's gaze is toward the second input area, the touch screen 110 displays a second menu providing additional options to control the application executed on the electronic device 100 in the second input area on the touch screen 110.

The processor 102 determines whether an option is selected from the menu. The processor 12 determines whether there is a sub menu for the selected option and, if there is no sub menu for the selected option, performs an operation according to the selected option, or, if there is a sub menu for the selected menu, the processor 120 displays a sub menu for the selected option.

The processor 120 adjusts the size of a content displayed on the touch screen 100 in proportion to a distance from the electronic device 100 to a user.

Figure 19:
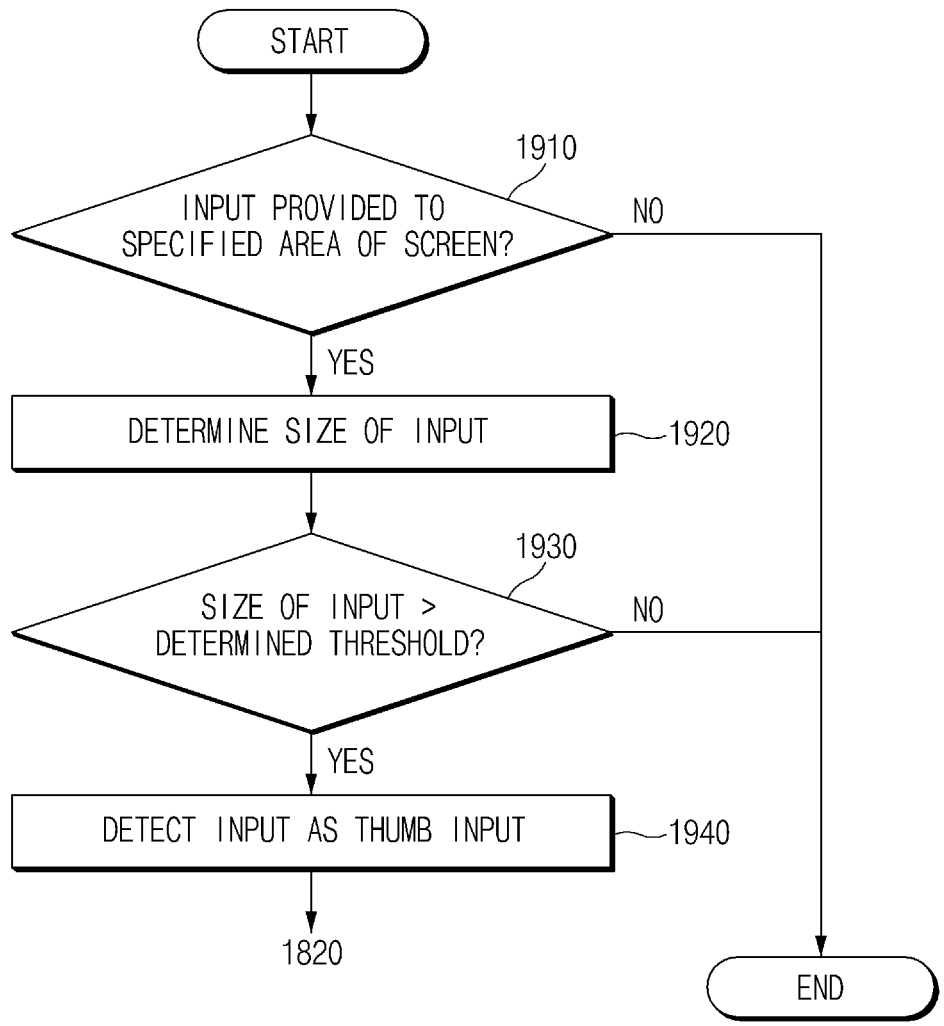
FIG. 19 is a flowchart illustrating a method of providing a user interface in an electronic device, according to an embodiment of the present invention.

FIG. 19 is a flowchart illustrating a method of providing a user interface in the electronic device 100, according to an embodiment of the present invention.

Step 1810 shown in FIG. 18 may include operations shown in FIG. 19.

At step 1910, the processor 120 determines whether the input is provided to a specified area of a screen. For example, the specified area may be an area within a predetermined distance from the edge of the screen.

When the input is provided to the specified area, the processor 120 performs step 1920. When the input is not provided to the specified area, the processor 120 terminates a process for providing user interface.

At step 1920, the processor 120 determines the size of the input.

At step 1930, the processor 120 determines whether the size of the input is greater than the size of a determined threshold. The threshold is a value corresponding to a criteria for determining whether an input on a screen is a thumb input and may be determined by each user. For example, the threshold may be determined based on the size of a user's thumb.

When the size of the input is greater than the determined threshold in the specified area, the processor 120 performs step 1840 of FIG. 18. When the size of the input is less than the determined threshold, the processor 120 terminates a process for providing user interface.

At step 1940, the processor 120 detects the input as a thumb input. The processor 120 performs step 1820 of FIG. 18 on the detected thumb input. The user's gazing direction may be determined with respect to the detected thumb input.

Figure 20:
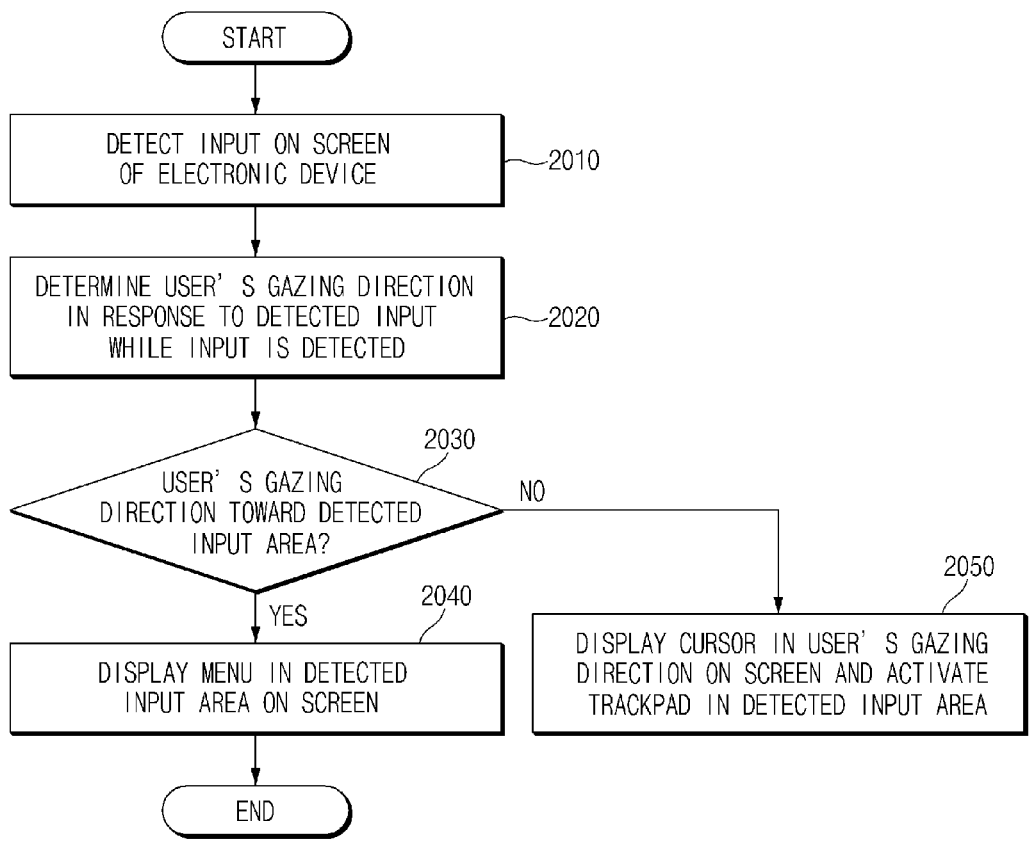
FIG. 20 is a flowchart illustrating a method of providing a user interface in an electronic device, according to an embodiment of the present invention.

FIG. 20 is a flowchart illustrating a method of providing a user interface in the electronic device 100, according to an embodiment of the present invention.

At step 2010, the processor 120 detects an input oldie electronic device 100 through the touch screen 110.

At step 2020, while the input is detected, the processor 120 determines a user's gazing direction in response to the detected input.

At step 2030, the processor 120 determines whether the user's gazing direction is toward the detected input area.

When the users gazing direction is toward the detected input area, the processor 120 performs step 2040. When the user's gazing direction is spaced from the detected input area, the processor 120 performs step 2050.

At step 2040, the touch screen 110 displays a menu in the detected input area. The menu may provide options for controlling an application executed on the electronic device 100.

At step 2050, the processor 120 displays a cursor in the direction of the user's gazing direction on the touch screen 110 and activates a trackpad in the detected input area.

With a movement in a small area near the edge of the touch screen 110, an entire touch screen may be controlled and additionally various functions may be provided. Additionally, the electronic device actively displays a menu relating to a display of the touch screen 110 at the position that a user wants or at the position where user's manipulation is convenient. Accordingly, the electronic device 100 improves user's convenience and may provide user-friendly UI and UX to a user.

According to various embodiments, at least part of a device (for example, modules or functions thereof) or a method (for example, operations) according to this disclosure, for example, as in a form of a programming module, may be implemented using an instruction stored in computer-readable storage media. When an instruction is executed by at least one processor, the at least one processor may perform a function corresponding to the instruction. The computer-readable storage media may include the storage unit 130, for example. At least part of a programming module may be implemented (for example, executed) by processor 120, for example. At least part of a programming module may include a module, a program, a routine, sets of instructions, or a process to perform at least one function, for example.

The computer-readable storage media may include Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction (for example, a programming module) such as Read Only Memory (ROM), Random Access Memory (RAM), and flash memory. Additionally, a program instruction may include high-level language code executable by a computer using an interpreter in addition to machine code created by a complier. The hardware device may be configured to operate as at least one software module to perform an operation of this disclosure and vice versa.

Additionally, a programming module may include at least one of the above-mentioned components or additional other components, or part of the programming module may be omitted. Operations performed by a module, a programming module, or other components according to various embodiments of the present invention may be executed through a sequential, parallel, repetitive or heuristic method. Additionally, some operations may be executed in a different order or may be omitted. Or, other operations may be added.

While the present invention has been shown and described with reference to certain embodiments thereof, it should be understood by those skilled in the art that many variations and modifications of the method and apparatus described herein will still fall within the spirit and scope of the present invention as defined in the appended claims and their equivalents.

What is claimed is:

1. A method of providing user interface, the method comprising:
    detecting a first touch input within a predetermined distance from an edge of a touch screen;
    displaying a first cursor at a position spaced away from the first touch input in response to the first touch input;
    detecting a movement of the first touch input in a first area while maintaining the first touch input on the touch screen, the first area being mapped to a screen of the touch screen and determined according to a position where the first touch input occurs;
    moving the first cursor in the same manner as the movement of the first touch input in the first area;
    detecting a user's gazing position; and
    when the user's gazing direction is identical to the position of the first touch input, removing the first cursor and displaying a first menu relating to a content displayed on the touch screen at the position of the first touch input.

2. The method according to claim 1, further comprising, when the first touch input is released, selecting an item displayed at the position of the first cursor of the touch screen at a time that the first touch input is released.

3. The method according to claim 1, further comprising:
    detecting a second touch input within a predetermined distance from the edge of the touch screen;
    displaying a second cursor at a position spaced away from the second touch input on the touch screen in response to the detected second touch input;
    detecting a movement of the second touch input in a second area on the touch screen, the second area being mapped to the screen of the touch screen and determined according to a position where the second touch input occurs; and
    moving the second cursor in the same manner as the movement of the second touch input in the second area on the touch screen.

4. The method according to claim 3, further comprising, when the first cursor and the second cursor are disposed on the same object of the touch screen and the first touch input and the second touch input moving the first cursor and the second cursor are detected simultaneously, rotating the object.

5. The method according to claim 1, further comprising:
    detecting a second touch input thereby activating an area selection function; and displaying a selection area on the touch screen according to a movement of the first cursor by detecting the movement of the first touch input.

6. The method according to claim 5, further comprising:
detecting a third touch input within a predetermined distance from the edge of the touch screen; and
displaying a menu relating to the selection area on the touch screen.

7. The method according to claim 1, further comprising:
detecting a user's gazing position; and
when the user's gazing position is spaced away from the position of the first touch input, displaying the first cursor at the user's gazing position.

8. The method according to claim 1, further comprising;
detecting the movement of the first touch input on the first menu; and
when the first touch input is released, applying an item displayed at a position where the first touch input is released to the content.

9. The method according to claim 1, further comprising displaying a sub menu of the item at the position of the first menu by a selection of an item on the first menu, wherein the first menu is a multi-level menu.

10. The method according to claim 1, further comprising, when a first item of the first menu is selected by the movement of the first touch input, displaying the first menu in a changed form at the position of the first menu.

11. The method according to claim 1, further comprising:
detecting a second touch input from the touch screen;
removing the first cursor in response to the detected second touch input and displaying a first menu relating to a content displayed on the touch screen at the position of the first touch input; and
if there is a second menu relating to the content, displaying the second menu at a position where the second touch input occurs.

12. The method according to claim 11, further comprising, when a first item of the first menu is released in a predetermined manner toward the second menu, delivering the first item from the first menu to the second menu.

13. The method according to claim 1, further comprising:
detecting a second touch input corresponding to drawing a text on the touch screen; and
executing a shortcut that the text indicates in relation to the first menu.

14. The method according to claim 8, further comprising, when there is an item applicable to the first menu at the user's gazing position, applying an item displayed at the position where the first input is released to an item of the user's gazing position.

15. A method of providing user interface, the method comprising:
detecting an input on a screen of an electronic device;
determining a user's gazing direction in response to the detected input while the input is being detected;
determining a function corresponding to the determined user's gazing direction;
performing the determined function;
when the user's gazing direction is toward the detected input, displaying, on the screen of the electronic device, a menu providing options for controlling an application that can be executed on the electronic device in the area of the detected input; and
when the user's gazing direction is spaced away from the area of the detected input, displaying a cursor in the user's gazing direction on the screen and activating a trackpad in the area of the detected input.

16. The method according to claim 15, wherein detecting the input comprises:
determining whether the input is provided to a specified area of the screen of the electronic device;
when the input is provided to the specified area, determining the size of the input;
comparing the size of the input with a determined threshold; and
when the size of the input is greater than the determined threshold in the specified area, detecting the input as a thumb input.

17. The method according to claim 15, further comprising:
determining whether the user's grazing direction is toward the detected input; and
determining the function based on whether the user's gazing direction is toward an area of the detected input.

* * * * *